(12) United States Patent
Kawakami et al.

(10) Patent No.: US 8,677,167 B2
(45) Date of Patent: Mar. 18, 2014

(54) STORAGE APPARATUS AND POWER CONTROL METHOD

(75) Inventors: Norihiko Kawakami, Sagamihara (JP); Hajime Mori, Yokohama (JP); Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 707 days.

(21) Appl. No.: 12/989,525

(22) PCT Filed: Oct. 18, 2010

(86) PCT No.: PCT/JP2010/006160
§ 371 (c)(1),
(2), (4) Date: Oct. 25, 2010

(87) PCT Pub. No.: WO2012/053026
PCT Pub. Date: Apr. 26, 2012

(65) Prior Publication Data
US 2012/0096289 A1    Apr. 19, 2012

(51) Int. Cl.
*G06F 1/32* (2006.01)
(52) U.S. Cl.
USPC ............................ 713/324; 713/320; 365/226
(58) Field of Classification Search
USPC ................... 713/320, 324; 365/226
See application file for complete search history.

(56) References Cited

U.S. PATENT DOCUMENTS

| | | | | |
|---|---|---|---|---|
| 5,546,558 A * | 8/1996 | Jacobson et al. | ............... | 711/114 |
| 6,898,667 B2 * | 5/2005 | Umberger et al. | ............ | 711/114 |
| 7,337,353 B2 * | 2/2008 | Yamamoto et al. | .......... | 714/47.2 |
| 7,428,622 B2 * | 9/2008 | Tulyani | ........................ | 711/161 |
| 7,698,517 B2 * | 4/2010 | Tulyani | ........................ | 711/161 |
| 8,006,111 B1 * | 8/2011 | Faibish et al. | ................. | 713/324 |
| 8,032,523 B2 * | 10/2011 | Hamilton et al. | ............ | 707/720 |
| 8,086,888 B2 * | 12/2011 | Obana et al. | .................. | 713/340 |
| 8,285,758 B1 * | 10/2012 | Bono et al. | .................... | 707/822 |
| 8,407,417 B2 * | 3/2013 | Matsuda et al. | ............... | 711/114 |
| 2006/0193073 A1 | 8/2006 | Hakamata et al. | | |
| 2009/0043942 A1 * | 2/2009 | Shiga | ................................ | 711/4 |
| 2009/0043982 A1 | 2/2009 | Kano et al. | | |
| 2010/0138677 A1 | 6/2010 | Pagan et al. | | |

FOREIGN PATENT DOCUMENTS

| | | | |
|---|---|---|---|
| JP | 2000293314 A | 10/2000 | |
| JP | 2003015915 A | 1/2003 | |
| WO | 2006060670 A2 | 6/2006 | |

* cited by examiner

*Primary Examiner* — Chun Cao
(74) *Attorney, Agent, or Firm* — Volpe and Koenig, P.C.

(57) ABSTRACT

To enable power saving control by putting storage areas of the same attribute together in a specific RAID group in a storage apparatus that includes storage areas of different access patterns.
The storage apparatus manages attributes of the RAID groups, which form a pool area, and attributes of the respective storage areas, based on an access log for each of the storage areas allocated to virtual volumes. The apparatus enables a power saving operation for each RAID group by putting the storage areas of each attribute together in a specific RAID group.

15 Claims, 26 Drawing Sheets

FIG. 3

| Page ID | Page attribute | RG | Last access date and time | Access schedule | Access count |
|---|---|---|---|---|---|
| 0 | Normal | 0 | 20100613 23:00 | 110000001111 111111111111 | 100 |
| 1 | Unaccessed power saving | 2 | 20080613 3:00 | 011111000000 000000000000 | 0 |
| 2 | Unaccessed power saving | 2 | 20090713 4:00 | 000011110000 000000000000 | 0 |
| 3 | Schedule power saving | 1 | 20100615 5:00 | 000000111111 111111110000 | 50 |
| 4 | Infrequently accessed power saving | 3 | 20100624 4:00 | 000011110000 000000000000 | 10 |
| 5 | Schedule power saving | 1 | 20100522 5:00 | 000000001111 111111000000 | 10 |
| ... | | | | | |

Page management table 300

FIG. 4

| RG | Power saving attribute | Operating state | HDD ID | Virtual LU | Power saving enabled time |
|---|---|---|---|---|---|
| 0 | Normal | Idle | 0,6,7,8,9 | 0 | - |
| 1 | Unaccessed power saving | Spin-down | 1,2,30,31,32,33, 34,35,36,37,38 | 2 | 0:00-24:00 |
| 2 | Schedule power saving | Spin-down | 3,5,20,21,22,23, 24,25,26,27,28 | 1 | 0:00-8:00 20:00-24:00 |
| 3 | Infrequently accessed power saving | LRPM | 4,10,11,12,13,14, 15,16,17,18,19 | 2 | 30min Idle |
| ... | | | | | |

RG management table 400

FIG. 5

| Virtual LU | Virtual LU capacity | Next allocation page |
|---|---|---|
| 0 | 50GB | 5 |
| 1 | 1TB | 10 |
| 2 | 30GB | 15 |
| ... | | |

Virtual volume management table 500

FIG. 6

| HDD ID | Type name | RG | Power mode | Power saving setting |
|---|---|---|---|---|
| 1 | Type1 | 0 | Spin-down | ON |
| 2 | Type1 | 0 | Spin-down | ON |
| 3 | Type1 | 0 | Spin-down | ON |
| 4 | Type1 | 0 | Spin-down | ON |
| 5 | Type1 | 0 | Spin-down | ON |
| 6 | Type1 | 0 | Spin-down | ON |
| 7 | Type1 | 0 | Spin-down | ON |
| 8 | Type1 | 0 | Spin-down | ON |
| 9 | Type1 | 0 | Spin-down | ON |
| 10 | Type1 | 1 | Spin-down | ON |
| 11 | Type1 | 1 | Idle | OFF |
| 12 | Type1 | 1 | Idle | OFF |
| ... | | | | |

HDD management table 600

FIG. 7

| Pool ID | Pool capacity | Number of allocated pages | Capacity depletion threshold | RG |
|---|---|---|---|---|
| 0 | 20TB | 50 | 16TB | 1,2,3 |
| 1 | 50TB | 200 | 40TB | 4,5,6,7,8,9,10 |
| ... | | | | |

Pool management table 700

FIG. 8

| Virtual LU (810) | Virtual page ID (820) | Page ID (830) |
|---|---|---|
| 0 | 1 | 1 |
| 0 | 2 | 2 |
| 0 | 3 | 10 |
| ... | | |

Address mapping table 800

FIG. 9

| Power saving attribute (910) | Operating mode (920) |
|---|---|
| Normal | Idle |
| Schedule power saving | Spin-down |
| Infrequently accessed power saving | LRPM |
| Unaccessed power saving | Spin-down |
| ... | ... |

Attribute management table 900

FIG. 10

| Virtual LU | Pool ID | Allocation RG | Next allocation page ID |
|---|---|---|---|
| 1 | 0 | RG1/RG2 | 5 |
| 2 | 0 | RG1/RG2 | 5 |
| 3 | 0 | RG1/RG2 | 5 |
| 4 | 1 | RG4/RG6 | 10 |
| ... | ... | ... | ... |

Page allocation management table 1000

FIG. 21
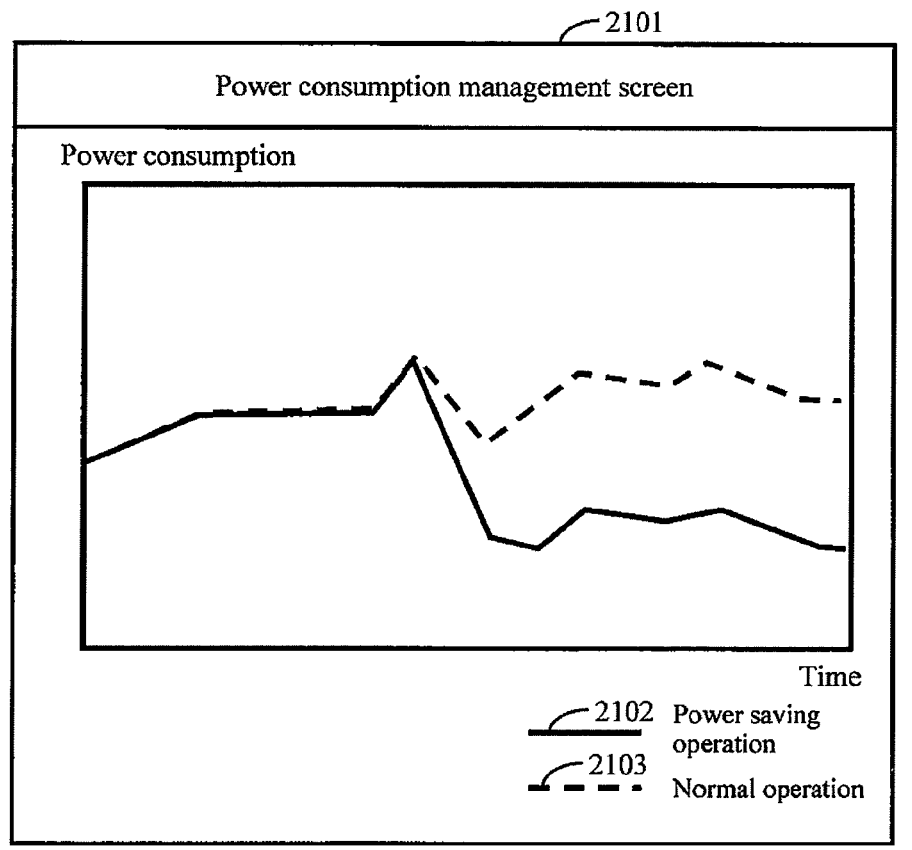
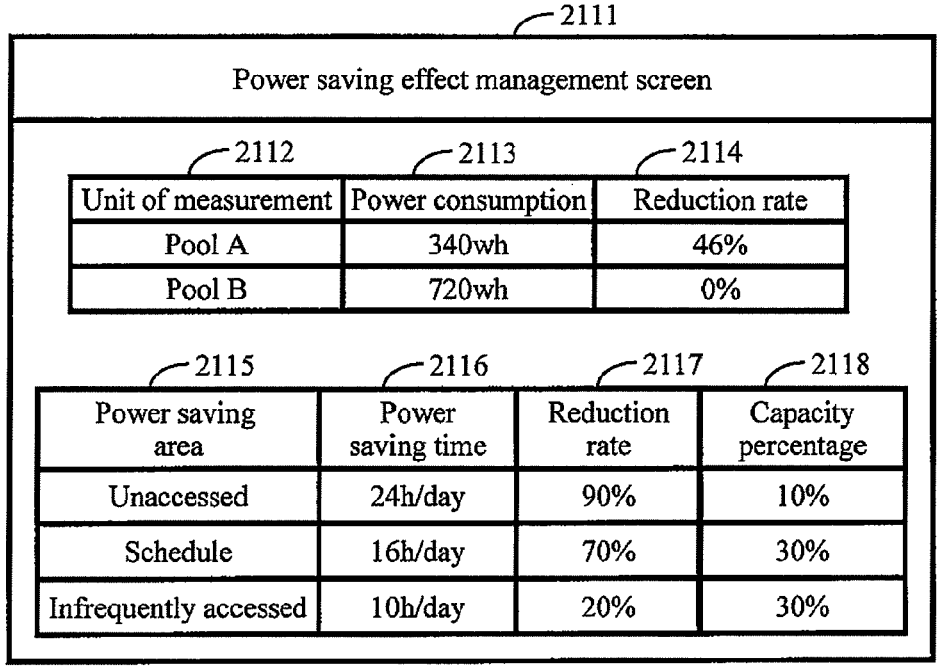

FIG. 25

| Page ID | Page attribute | Referencing page ID | Duplication | RG |
|---|---|---|---|---|
| 0 | Normal | 10,20,30,35,38 | 5 | 0 |
| 1 | Power saving | 40,50,60 | 3 | 2 |
| 2 | Power saving | 15 | 1 | 2 |
| 3 | Power saving | — | 0 | 2 |
| ... | | | | |

Page Duplication management table 2500

FIG. 27

| Page ID | Page attribute | RG | Last access date and time | Access schedule | Access count | Duplication |
|---|---|---|---|---|---|---|
| 0 | Normal | 0 | 20100613 23:00 | 110000001111 111111111111 | 100 | 20 |
| 1 | Unaccessed power saving | 2 | 20080613 3:00 | 011111000000 000000000000 | 0 | 3 |
| 2 | Nonredundant power saving | 2 | 20090713 4:00 | 000011110000 000000000000 | 0 | 0 |
| 3 | Schedule power saving | 1 | 20100615 5:00 | 000000001111 1111111100000 | 50 | 10 |
| 4 | Infrequently accessed power saving | 3 | 20100624 4:00 | 000011110000 00000000000 | 0 | 4 |
| 5 | Schedule power saving | 1 | 20100522 5:00 | 000000001111 111111110000 | 10 | 0 |
| ... | | | | | | |

Columns labeled: 310, 320, 330, 340, 350, 360, 370

Page management table 2700

STORAGE APPARATUS AND POWER CONTROL METHOD

TECHNICAL FIELD

The present invention relates to a storage apparatus and a power control method, and particularly applied to a storage apparatus that is capable of operating with reduced power consumption.

BACKGROUND ART

A storage apparatus has a plurality of hard disk drives (hereinafter, referred to as HDD) and manages the group of HDDs by using a system known as RAID (Redundant Array of Independent/Inexpensive Disks). The group of HDDs stores various kinds of data. It may store the data that is not accessed for a certain time period, for example, an old file or backup data. The group of HDDs that forms a RAID GROUP (hereinafter, referred to as RAID group) that stores the data is in an unused state during the period when the data is not accessed.

As a method for reducing power consumption of a storage apparatus by changing the operating mode of apparatus to a power saving mode, a method of stopping an unused HDD among a plurality of HDDs that form the storage apparatus or otherwise methods are known. For example, PTL 1 discloses a technique of reducing the power consumption by monitoring I/O to the storage apparatus and changing the operating mode of the HDDs that has not been accessed for a certain time period to a power saving mode.

Incidentally, as for the storage apparatus, it is required to decide a storage capacity to be needed in future and allocate it to a volume in advance in the design stage. For that reason, HDDs that are not used in fact have to be bought in advance; accordingly, the cost the storage user bears tends to increase. In order to solve the problem, PTL 2 discloses a Thin Provisioning technique that provides a virtual volume, which is a virtual storage area, for a host computer and allocates a necessary capacity when data is written from the host computer in fact.

In the technique, an area called pool area is prepared on a storage system so that a plurality of host computers shares a plurality of virtual volumes via the pool area, and when data is to be written from a host computer, an area required for writing the data is allocated to the virtual volume. The storage system that adopts the technique is capable of flexibly increasing the capacity of the pool area by adding an HDD as required.

CITATION LIST

Patent Literature

PTL 1: JP Patent Publication (Kokai) No. 2000-293314 A
PTL 2: JP Patent Publication (Kokai) No. 2003-15915 A

SUMMARY OF INVENTION

Technical Problem

In PTL 1, the power saving effect is improved in a manner of transferring an unaccessed HDD to a power saving mode to reduce the power consumed to operate an unused HDD.

On the other hand, in a storage capacity virtualization environment that uses the Thin Provisioning technique, a page is allocated in response to a writing request or the like from a host computer. The page is a unit of real capacity in allocating a necessary area from the pool area to the virtual volume. The pool area is formed by one or more RAID groups and, generally, pages are allocated in order from all RAID groups in the pool so that the RAID groups in the pool area are equally used, i.e., the pages are distributed among a plurality of RAID groups.

In the case where both the power saving technique that transfers an unused HDD to a power saving mode and the capacity virtualization environment are used together, however, there is a problem of hardly providing a sufficient power saving effect. This is probably because a plurality of virtual volumes shares the pool area in the capacity virtualization environment. Generally, an access pattern to a virtual volume differs according to the use of the host computer that uses the virtual volume. For that reason, the RAID groups that form the pool area receive various accesses respectively based on the individual access patterns of all the host computers that share the pool area. Consequently, the unused state, in which an access does not occur, hardly occurs in the set of the RAID groups; that is considered to cause the problem.

Then, the present invention provides a storage apparatus and a power control method capable of providing a power saving effect by giving attributes to a set of pages that are distributed and stored in RAID groups and a set of the RAID groups in a pool area, which are shared by a plurality of virtual volumes, based on access logs (access patterns) or duplication of data, by classifying the pages to each attribute, and by intensively relocating the pages of each attribute in the capacity virtualization environment of the storage apparatus.

Solution to Problem

In order to achieve the above-mentioned object, the present invention classifies respective storage areas to attributes based on access logs or duplication of data, and also gives the same attributes to the RAID groups that provide capacities necessary to store the storage areas, in the capacity virtualization environment of the storage apparatus. Then, it moves the storage areas so that the storage areas of the same attributes are intensively stored in the RAID groups of the same attributes respectively.

Advantageous Effects of Invention

According to the present invention, a power saving operation of the RAID groups can be effectively performed, while the capacity virtualization environment of the storage is being provided.

BRIEF DESCRIPTION OF DRAWINGS

FIG. 3 is a schematic diagram of a page management table for managing page information in the embodiment of the present invention.

FIG. 4 is a schematic diagram of an RG management table for managing RAID group information in the embodiment of the present invention.

FIG. 5 is a schematic diagram of a virtual volume management table for managing virtual volume information in the embodiment of the present invention.

FIG. 6 is a schematic diagram of an HDD management table for managing HDD information in the embodiment of the present invention.

FIG. 7 is a schematic diagram of a pool management table for managing pool area information in the embodiment of the present invention.

FIG. 8 is a schematic diagram of an address mapping table for managing an association between virtual pages and pages in the embodiment of the present invention.

FIG. 9 is a schematic diagram of an attribute management table for managing a power saving attribute setting in the embodiment of the present invention.

FIG. 10 is a schematic diagram of a page allocation management table for managing a page allocation setting in the embodiment of the present invention.

FIG. 21 is a management screen displaying power consumption and power saving effects in the embodiment of the present invention.

FIG. 25 is a schematic diagram of a page duplication management table for managing a duplication state of pages in the embodiment of the present invention.

FIG. 27 is a schematic diagram of a page management table for managing the page information in the embodiment of the present invention.

DESCRIPTION OF EMBODIMENTS

Embodiments of the present invention will be described below with reference to the drawings.

Example 1

A first embodiment of the present invention will be described below. The embodiment is to manage attributes of pages and RAID groups based on access patterns to the pages and to intensively locate a group of pages of the same attribute in a RAID group of the same attribute in the case where a storage apparatus is operating in a capacity virtualization environment.

Figure 1:
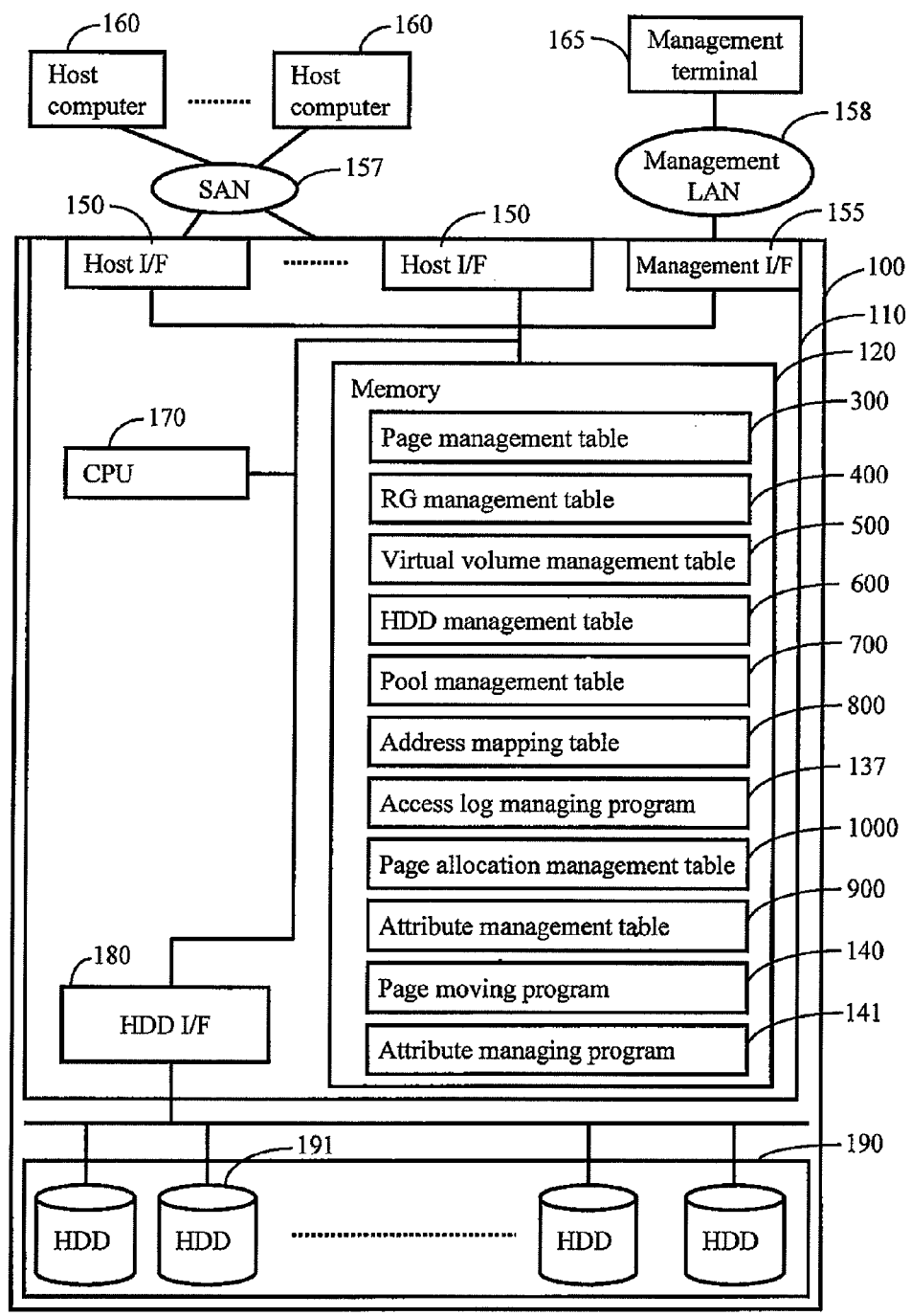
FIG. 1 is a block diagram of a storage system in an embodiment of the present invention.

FIG. 1 is a block diagram of a storage system according to a first embodiment of the present invention. In the storage system, a host computer 160 is connected to a storage apparatus 100 via a SAN 157 (Storage Area Network) and a management terminal 165 is connected to the storage apparatus 100 via a management LAN 158.

The host computer 160 is a computer for issuing an I/O request (read request or write request) to the storage apparatus 100, and the management terminal 165 is a computer for managing the storage apparatus 100.

The storage apparatus 100 includes a controller 110 and a storage unit 190. The storage unit 190 includes one or more HDDs 191. The storage apparatus 100 may include another storage device such as an SSD (Solid State Drive) or an optical drive, for example, in addition to the HDD 191.

The controller 110 includes a host interface 150 (hereinafter and in the drawing, referred to as host I/F), a management interface 155 (hereinafter and in the drawing, referred to as management I/F), a CPU 170 (Central Processing Unit), a memory 120, and an HDD interface 180 (hereinafter and in the drawing, referred to as HDD I/F).

The host I/F 150 sends and receives data or a data input/output request to and from the host computer 160 connected thereto via the SAN 157.

The management I/F 155 is responsible for communication with an external device such as the management terminal 165 connected thereto via the management LAN 158, and sends and receives management information and a management request to the storage apparatus 100 from the management terminal 165.

The HDD I/F 180 is an interface circuit for the controller 110 to communicate with the storage unit 190. According to the control of the controller 110, it controls setting, operation and the like to the HDD 191.

The memory 120 is a memory for storing information necessary for controlling the storage apparatus 100. The memory 120 stores a page management table 300, an RG management table 400, a virtual volume management table 500, an HDD management table 600, a pool management table 700, an address mapping table 800, an access log managing program 137, a page allocation management table 1000, an attribute management table 900, a page moving program 140, and an attribute managing program 141. The memory 120 may be a non-volatile memory.

The CPU 170 controls input/output of the data that is sent and received via the host I/F 150 and the management I/F 155 as well as information of the storage apparatus 100, and also reads out respective programs or respective tables that are stored in the memory 120 and executes the read out programs. The CPU 170 is also simply called as processor.

The HDD 191 stores the data or the information of the storage apparatus 100 and changes the operating mode according to an instruction from the HDD I/F 180.

Figure 2:
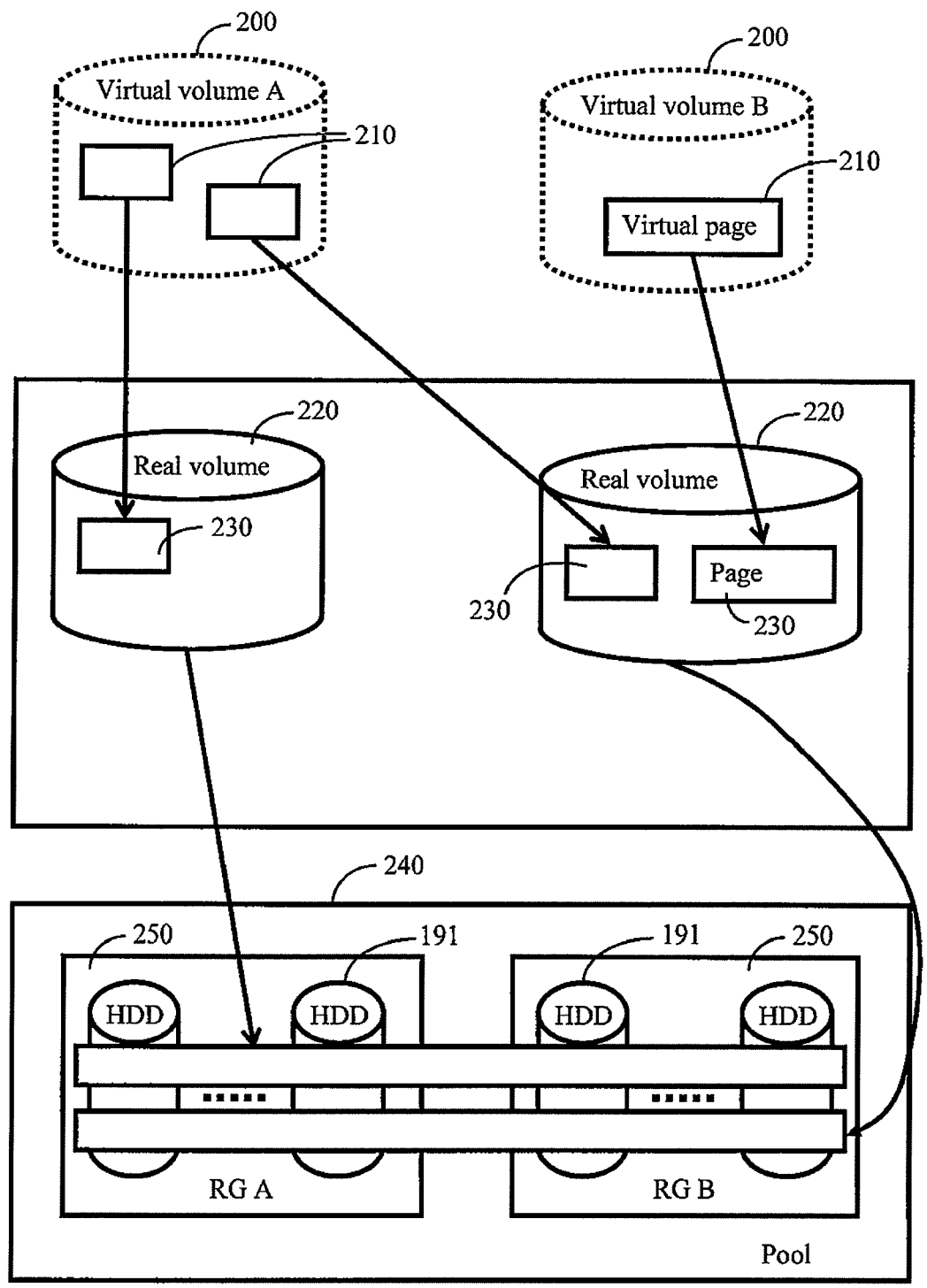
FIG. 2 is an explanatory drawing showing a logical configuration of a group of drives in the embodiment of the present invention.

FIG. 2 is a drawing showing a logical configuration of a group of HDDs 191 in the embodiment.

The storage unit 190 includes a plurality of HDDs 191. The plurality of HDDs 191 form a RAID group 250, and one or more real volumes 220 are created on a storage area of one RAID group 250. A storage area formed by one or more real volumes 220 is called a pool 240. One pool 240 is formed by one or more RAID groups 250.

In the capacity virtualization environment of the storage apparatus 100, a virtual volume 200, which is a virtual storage area, is provided for the host device as an access object of the host computer 160. The virtual volume 200 has a volume capacity set but does not initially have a storage area of the real volume 220 allocated thereto. The storage area is allocated from the real volume 220 of the pool 240 to a virtual page 210 of the virtual volume 200 by the capacity consumed in fact by the unit of page 230, which is a unit of allocation of the storage area, when a write request is issued from the host computer 160 in fact. After the allocation, the virtual page 210 in the virtual volume 200 and the page 230 in the real volume 220 of the pool 240 are associated with each other.

Generally, a method for distributing the allocation of the pages 230 among the plurality of RAID groups 250 in the pool 240 by allocating the pages 230 to the plurality of RAID groups 250 in order is adopted. For example, when a write request is issued from the host computer 160 corresponding to a virtual volume 200A, the virtual pages 210 corresponding to the virtual volume 200A are identified first, and then it is judged whether the pages 230 associated with the virtual pages 210 have been present or not. If the associated pages 230 have not been present, a new page 230 is allocated to the virtual page 210 from the real volume 220. Here, the pages 230 are allocated from all the RAID groups 250 that form the pool 240 in order such that a first page 230 is allocated from a RAID group 250A and a second page 230 is allocated from a RAID group 250B.

FIG. 3 is a schematic diagram of the page management table 300, which is a table for managing setting information and access log information of the pages 230.

The page management table 300 includes Page ID 310, Page Attribute 320, RG 330, Last Access Date and Time 340, Access Schedule 350, and Access Count 360.

In Page ID 310, an ID for uniquely identifying the page 230 is recorded. In Page Attribute 320, a power saving attribute given to the page 230 is recorded. For example, Normal Attribute indicating that a power saving control is not performed on the page 230, Schedule Power Saving Attribute that is given to the page 230 that is not accessed in a time zone set on a schedule, Infrequently Accessed Power Saving Attribute that is given to the page 230 that is infrequently accessed in a certain time period, and Unaccessed Power Saving Attribute that is given to the page 230 that is not accessed in a certain time period are set. If there is another condition to be used for power saving control, the corresponding another attribute may be set to the page 230 for management. In RG 330, an identifier of the RAID group 250 for representing the RAID group 250 in which each page 230 is located is stored. In Last Access Date and Time 340, information on year, month, date, hour, and minute is stored as the information with respect to the date and time when each page 230 is accessed last. In Access Schedule 350, information on occurrence of access to each page 230 for each hour is stored. For example, in the embodiment, 24 digits are stored in Access Schedule 350. Each digit represents the occurrence of access in each hour such that the first digit (the leftmost digit of the upper line of Access Schedule 350 in the drawing) represents the access occurrence state from 0 o'clock to 1 o'clock, the second digit from the left represents the access occurrence state from 1 o'clock to 2 o'clock, and the last digit (the rightmost digit of the lower line of Access Schedule 350 in the drawing) represents the access state from 23 o'clock to 0 o'clock. It indicates that the page 230 is accessed in the time zone for which the digit '1' is stored. On the other hand, it indicates that the page 230 is not accessed in the time zone for which the digit '0' is stored. By the digits in Access Schedule 350, the occurrence of access to each page can be managed for each hour. The time zone with no access can be grasped for the page 230 that stores data used for only several hours in the night such as backup data, for example. If the time zone with no access can be grasped, it is possible to perform power saving control by selecting the time zone. Although the access occurrence to the pages 230 is managed for each hour in the embodiment, the access occurrence may be recorded by finer granularity such as for each ten minutes or by coarser granularity such as for each day according to the use. In Access Count 360, the number of accesses occurred to each page 230 in a certain time period is stored. The time period for measuring Access Count 360 may be set any of for each hour or for each day or any optimal time zone for obtaining a power saving effect such as a specific time zone.

FIG. 4 is a schematic diagram of the RG management table 400 for managing information on the RAID group 250. The RG management table 400 includes RG 410, Power Saving Attribute 420, Operating State 430, HDD ID 440, Virtual LU 450, and Power Saving Enabled Time 460.

In RG 410, an identifier for uniquely identifying the RAID group 250 is stored. In Power Saving Attribute 420, the attribute that is given to the RAID group 250 is recorded. For example, Normal Attribute is set for the RAID group 250 to which power saving control is not performed, Schedule Power Saving Attribute is set for the RAID group 250 that is not accessed in the time zone set on a schedule, Infrequently Accessed Power Saving Attribute is set for the RAID group 250 that is infrequently accessed in a certain time period, and Unaccessed Power Saving Attribute is set for the RAID group 250 that is not accessed in a certain time period. If another condition is presented for the power saving control, another attribute corresponding to the condition may be managed and set for the RAID group 250. In Operating State 430, the operating mode that indicates the operation state of the plurality of HDDs 191, which form the RAID group 250, is stored. In the embodiment, the operating mode of the HDD 191 managed in Operating State 430 includes Idle, which is the state at a normal rotation responsive to I/O; LRPM, which needs a certain time to respond since the rotation is controlled to low rate but can be expected to provide a certain degree of power saving effect; and Spin-down, which is the state where the rotation of the HDD 191 is stopped. Although not described in the embodiment, the HDD 191 may be operated in the other operating modes such as the state of processing I/O; Unload, which shortens the response time and can be expected to provide a small power saving effect by unloading the head of the HDD 191; and Power Off, which turns off the HDD 191. In HDD ID 440, an ID for uniquely identifying the HDD 191 that forms the RAID group 250 is stored. In Virtual LU 450, an identifier (LUN or the like) of the virtual volume 200 that is associated with the RAID group 250 is stored. Stored in Power Saving Enabled Time 460 is information of the time zone in which the RAID group 250 can be transferred to the power saving mode, if known. In the embodiment, it is judged that the RAID group 250 corresponding to '2' in RG 410 can be stopped from 20 o'clock to 8 o'clock so that the values 0:00-8:00 and 20:00-24:00 are stored. The period may be represented by the unit like day or month, or otherwise, the condition such as no access is occurred for a certain time period, for example 30 minutes. The value may be stored in any format without being limited to the form described in the embodiment, if only it can be judged by the storage apparatus 100.

FIG. 5 is a schematic diagram of the virtual volume management table 500 for managing information on the virtual volume 200. The virtual volume management table 500 includes Virtual LU 510, Virtual LU Capacity 520, and Next Allocation Page 530.

In Virtual LU 510, an identifier (LUN or the like) for uniquely identifying the virtual volume 200 is stored. In Virtual LU Capacity 520, a value indicating the volume capacity that is set when the virtual volume 200 is created is stored. In Next Allocation Page 530, an identifier of the page that is to be newly allocated when a write request is issued to the virtual volume 200 is stored.

FIG. 6 is a schematic diagram of the HDD management table 600 for managing information on the HDD 191. The HDD management table 600 includes HDD ID 610, Type Name 620, RG 630, Power Mode 640, and Power Saving Setting 650.

In HDD ID 610, an identifier for uniquely identifying the HDD 191 is stored. In Type Name 620, an identifier representing the kind of the HDD 191 is stored. Type Name 620 is generally represented as the type name of the HDD product. With Type Name 620, information including the name of the vendor that produces the HDD 191, the interface type such as SAS/SATA, capacity, rpm, and the operating mode supported by the HDD 191 (Unload, LPRM, or the like) can be managed. In RG 630, an identifier for identifying the RAID group 250 formed by the HDDs 191 is stored. In Power Mode 640, the operating mode of the operating HDD 191 is stored. Although there are various operating modes like Idle, LRPM, Spin-down, and Power OFF, the operating mode supported by the HDD 191 depends on the model of the HDD 191. The operating mode supported by the HDD 191 is also determined by the information on the HDD model identified by Type Name 620. In Power Saving Setting 650, whether a power saving attribute is set for the HDD 191 or not is recorded.

FIG. 7 is a schematic diagram of the pool management table 700 for managing information on the pool 240. The pool management table 700 includes Pool ID 710, Pool Capacity 720, Number of Allocated Pages 730, Capacity Depletion Threshold 740, and RG 750.

In Pool ID 710, an identifier for uniquely identifying the pool 240 is stored. In Pool Capacity 720, a capacity value that is set when the pool 240 is created is stored. In Number of Allocated Pages 730, the total number of pages that have already allocated in the pool 240 is stored. In Capacity Depletion Threshold 740, a capacity value that is referenced in alerting the administrator of the storage apparatus 100 to the danger of the capacity depletion of the pool 240 is stored. If the total capacity of the number of allocated pages exceeds Capacity Depletion Threshold 740, for example the CPU 170 notifies the administrator of that by displaying the alert on the management screen of the management terminal 165 or otherwise ways. On the other hand, the administrator who has received the notification of capacity depletion takes necessary measures such as adding the HDD 191. In RG 750, a set of identifiers of the RAID groups 250 that form the pool 240 is stored.

FIG. 8 is a schematic diagram of the address mapping table 800 for managing an association between the virtual pages 210 in the virtual volume 200 and the pages 230 allocated to the RAID groups 250 that form the pool 240 in the storage apparatus 100. The address mapping table 800 includes Virtual LU 810, Virtual Page ID 820, and Page ID 830.

In Virtual LU 810, an identifier for uniquely identifying the virtual volume 200 is stored. In Virtual Page ID 820, an identifier for uniquely identifying the virtual page 210, which is a storage area on the virtual volume 200, is stored. In Page ID 830, an identifier for identifying the page 230 associated with the virtual page 210 is stored. For example, the address mapping table 800 in FIG. 8 shows that the virtual page, which belongs to the virtual volume given by the identifier '0' in Virtual LU 810 and is indicated by the identifier '1' in Virtual Page ID 820, is allocated to the page 230, which is indicated by the identifier '1' in Page ID 830.

FIG. 9 is a schematic diagram of the attribute management table 900 for managing the association between the power saving attribute and the operating mode of the HDD 191 corresponding to the power saving attribute. The attribute management table 900 includes Power Saving Attribute 910 and Operating Mode 920.

In Power Saving Attribute 910, the kind of attribute managed by the storage apparatus 100 is stored. If it is not an object of power saving control, the power saving attribute 910 is managed as 'Normal' attribute. If it is an object of power saving control, the power saving attribute 910 is managed as any of 'Schedule' Power Saving attribute in which no access occurs at a determined time zone, 'Infrequently Accessed' Power Saving attribute in which few accesses occur in a certain time period, and 'Unaccessed' Power Saving attribute in which no access occurs in a certain time period. The attribute may be any kind without being limited to those in FIG. 9, if only it can be associated with a power saving control. In Operating Mode 920, an operating mode of the HDD 191 corresponding to the attribute in Power Saving Attribute 910 is stored. As respective power saving attributes, operating modes of the corresponding HDDs 191 after being transferred to the power saving modes are stored. In FIG. 9, three of Idle, Spin-down, and LRPM are shown in Operating Mode 920. In fact, Operating Mode 920 is not limited to the above-mentioned three but all the operating modes supported by the HDD 191 are covered. For example, the attribute management table 900 shown in FIG. 9 shows that the RAID group 250, for which 'Schedule' Power Saving attribute is set, is transferred to Operating Mode 920 of Spin-down after being transferred to the power saving mode.

FIG. 10 is a schematic diagram of the page allocation management table 1000 used for identifying the page 230 to be newly allocated if the page 230 has not been allocated to the virtual page 210, which has a write request or the like issued to its virtual volume 200 (if the page 230 is to be newly allocated to an unallocated area of the pool 240). The page allocation management table 1000 includes Virtual LU 1010, Pool ID 1020, Allocation RG 1030, and Next Allocation Page ID 1040.

In Virtual LU 1010, an identifier for uniquely identifying the virtual volume 200 is stored. In Pool ID 1020, an identifier of the pool 240, to which the virtual volume 200 belongs, is stored. In Allocation RG 1030, a list of identifiers, each of which is for identifying the RAID group 250, to which a new page 230 is to be allocated, among a set of RAID groups 250 that form the pool 240, to which the virtual volume 200 belongs, is stored. In Next Allocation Page ID 1040, an identifier of the page 230 corresponding to the virtual page 210, which is to be allocated to the virtual volume 200 when a write request or the like will be issued from the host computer 160 or the like, is stored. For example, the page allocation management table 1000 shown in FIG. 10 shows that a new page is allocated to Virtual LU '1' from the RAID groups '1' and '2', and when the next write request to the Virtual LU '1' will be issued, the page 230 of the page ID '5' is to be allocated. The page 230 to be allocated next is allocated from all the RAID groups 250 that form the pool 240 in order. For example, when a pool 240 is formed by three RAID groups 250 from the RAID group '1' to the RAID group '3', the pages 230 are allocated in order like the first page 230 is allocated from the RAID group '1', the next page 230 is allocated from the RAID group '2', and the next page is allocated from the RAID group '3', and as allocation is done from all the RAID groups 250 once, the next page 230 is allocated from the RAID group '1' again.

Figure 11:
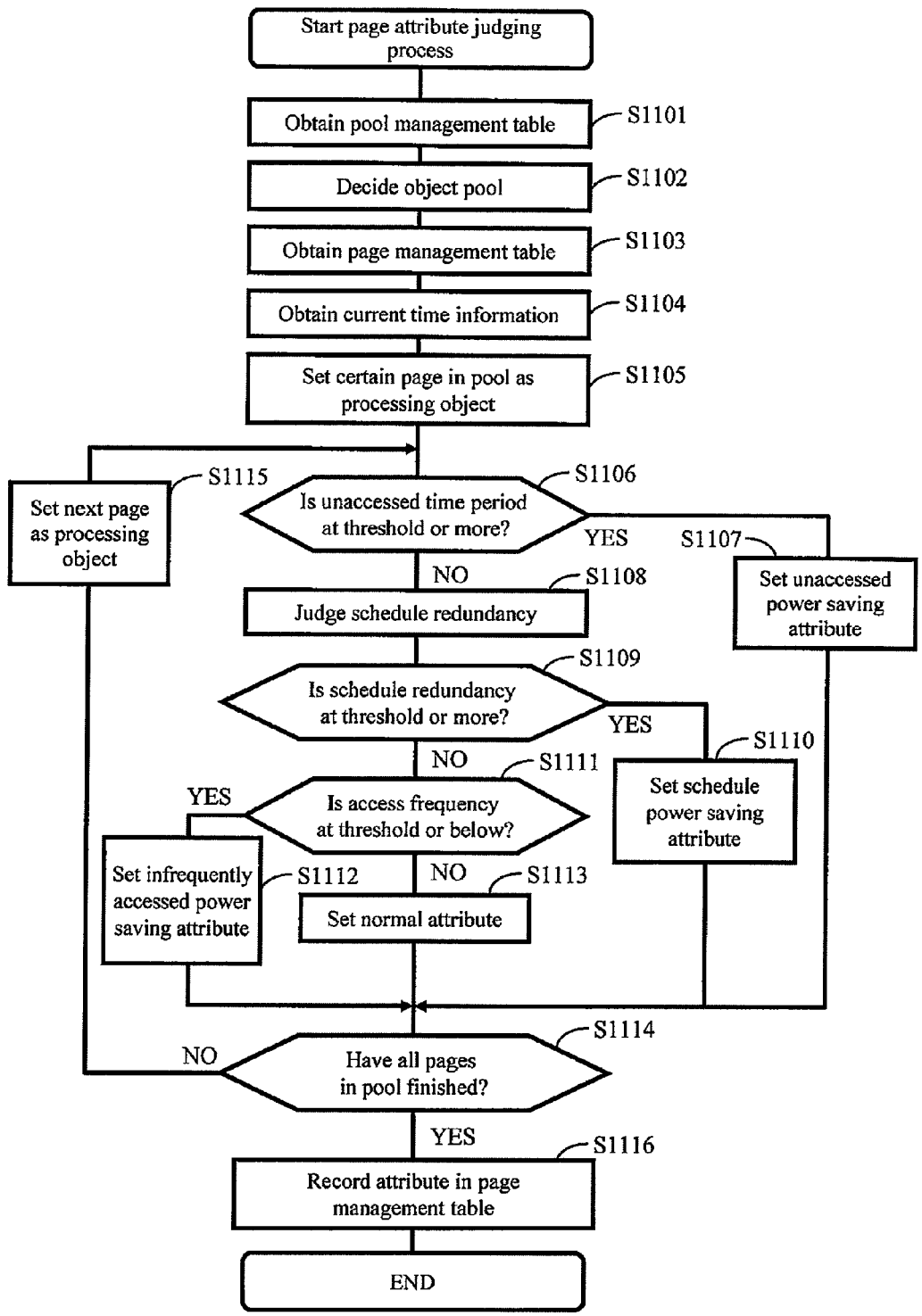
FIG. 11 is a flow chart showing a process of judging a page attribute in the embodiment of the present invention.

FIG. 11 is a flow chart showing a page attribute judging process. This judging process is executed by the CPU 170 of the storage apparatus 100 at predetermined intervals based on the attribute managing program 141. This interval is longer than that between processes of recording access logs. In the embodiment, the CPU 170 executes the judging process, for example, immediately before a process of moving the page 230 every other day.

In step S1101, the attribute managing program 141 reads in the pool management table 700 and obtains pool management information.

In step S1102, the pool 240 to be subjected to the page attribute judging process is determined. The page attribute judging process may be executed on all the pools 240 in the storage apparatus 100 or on just a specific pool 240 in a judging process.

In step S1103, the page management table 300 is read in and the management information of the page 230 is obtained.

In step S1104, the current time information is obtained. The time information to be obtained may be that managed in the storage apparatus 100 or that obtained through a network like NTP (Network Time Protocol). The time information is essential in managing access information of the page 230.

In step S1105, a certain page 230 in the pool 240 is set as an object page 230 of the attribute judging process.

In step S1106, whether an unaccessed time period is at the threshold or more is judged from the management information of the page 230 selected in step S1105. The unaccessed time period is judged from a difference time between the time information stored in Last Access Date and Time 340 on the page management table 300 and the current time information obtained in step S1104. It is assumed that the threshold in the embodiment is a month, for example. In that case, if the last access date and time 340 for the page 230 of the page ID '1' is 3 o'clock on Jun. 13, 2008 and the current time information is 0 o'clock on Jul. 1, 2010, it is understood that the unaccessed time period for the page 230 is about two years. Accordingly, it is judged that the unaccessed time period for the page 230 of the page ID '1' is at the threshold or more.

If it is judged at the threshold or more in step S1106, 'Unaccessed' Power Saving attribute is set for the corresponding page 230 in step S1107. On the other hand, when it is judged that the unaccessed time period for the page 230 is below the threshold in step S1106, a process of judging schedule redundancy is executed in step S1108.

In step S1108, redundancy of the unaccessed time zone is judged from the coincidence of access occurrence time zones between pages 230 allocated to the same RAID group 250 based on the access information in Access Schedule 350 on the page management table 300.

In the embodiment, schedule redundancy is provided as a judgment on coincidence in access occurrence by comparing on each page the access occurrence recorded in Access Schedule 350 on the page management table 300, for example. The access occurrence for each hour is recorded in Access Schedule 350 on the page management table 300 such that '1' is recorded in the time zone where access occurred and '0' is recorded in the time zone where access did not occur. Twenty-four digits are stored in the cell of Access Schedule 350 and each digit represents one hour. In the case of the Page ID '1', the upper left digit '0' represents the access in the time zone from 0:00-1:00, the second digit from the left in the upper line '1' represents the access in the time zone from 1:00-2:00, and in order, the rightmost digit in the upper line '0' represents the access occurrence from 11:00-12:00. Further, the leftmost digit in the lower line '0' represents the access in the time zone from 12:00-13:00, and the rightmost digit in the lower line '0' represents the access in the time zone from 23:00-24:00. When the page 230 of the page ID '3' and the page 230 of the page ID '5', both of which are associated with the same RAID group '1', are compared with each other for Access Schedule 350, both of them are not accessed in the time zones 0:00-5:00 and 20:00-24:00. When there are many time zones where both of the compared pages have '0' in the list of digits in the cell of Access Schedule 350, it is considered that the pages have many redundant unaccessed time periods.

By managing the access occurrence for each hour, it can be applied to the main uses of the storage apparatus 100 such as a backup use or batch processing, which are usually operated only in the night and business purposes which are only used during the business hours in the day so that the power saving effect can be provided. If more redundancy can be expected with respect to Access Schedule 350, the access occurrence may be managed by finer granularity, for example, for every ten minutes or for every day.

In step S1109, whether the redundancy of the unaccessed time zones in Access Schedule 350 corresponds to the power saving attributes or not is judged based on the judgment on redundancy in step S1108 by comparing the redundancy of the unaccessed time periods with a threshold. If it is judged from the redundancy of the unaccessed time zones that the HDD 191 storing the page 230 can be transferred to a power saving mode for a certain time period, the power saving effect can be provided by giving the power saving attribute to the page 230 and transferring the HDD 191 to a power saving mode in the unaccessed time zone. Therefore, a threshold for judging the power saving attribute is set in advance and if the redundancy judged in step S1109 is at the threshold or more, it is judged that an effective power saving control can be provided. For example, if the redundancy of the unaccessed time zones is '8' by the unit of hour, the power saving control can be provided for 8 hours. The threshold for the judgment may be a predetermined value set in the storage apparatus or may be individually set by users.

If the judgment in step S1109 shows that the power saving control can be provided, 'Schedule' Power Saving attribute is set for the page 230 in step S1110.

On the other hand, when the judgment in step S1109 shows that the power saving effect cannot be provided, whether the access frequency for the page 230 is at the threshold or less is judged in step S1111. The access frequency is judged from the number of accesses occurred to the page 230 during a predetermined period of time based on the value recorded in the cell of Access Count 360 on the page management table 300. In the embodiment, the time period for judging the access frequency is a day. For example, the threshold of the access frequency is ten times. In that case, if the value in the cell of Access Count 360 for the page ID '1' is '0', it is judged that the access frequency for the page 230 is below the threshold.

If the judgment in step S1111 shows that the access frequency for the page 230 is below the threshold, 'Infrequently Accessed' Power Saving attribute is set to the page 230 in step S1112. Power saving operation based on the standard of access frequency includes Spin-down and LRPM. Spin-down or the like provides a high power saving effect but is characteristic of a long response time to the host computer 160. Therefore, if the operation with a long response time to the host computer 160 may cause a problem, the LRPM power saving mode, which takes a short response time to the host computer 160 in spite of providing the power saving effect not as much as that of Spin-down, is selected. By selecting the LRPM power saving mode, it can be operated near to the normal state even if it is accessed from the host computer 160.

On the other hand, if the judgment in step S1111 shows that the access frequency for the page 230 is at the threshold or more, 'Normal' attribute is set to the page 230 in step S1113.

Next, in step S1114, whether the attribute judging process has finished for all the pages 230 in the pool 240, which is selected as processing object in step S1102, or not is judged.

If the judgment in step S1114 shows that the process has not finished for all the pages 230 yet, the next page 230 is set as the processing object in step S1115 and the page attribute judging process for the page 230 continues from step S1106.

On the other hand, if the judgment in step S1114 shows that the attribute judging process has finished for all the pages 230 in the pool 240, the attribute managing program 141 reflects the result of the page attribute judging process to the page management table 300 in step S1116. Specifically, the attribute managing program 141 updates the cell of Power Saving Attribute 320 on the page management table 300 with the attributes of respective pages 230 as update information, and finishes a series of attribute managing process.

Figure 12:
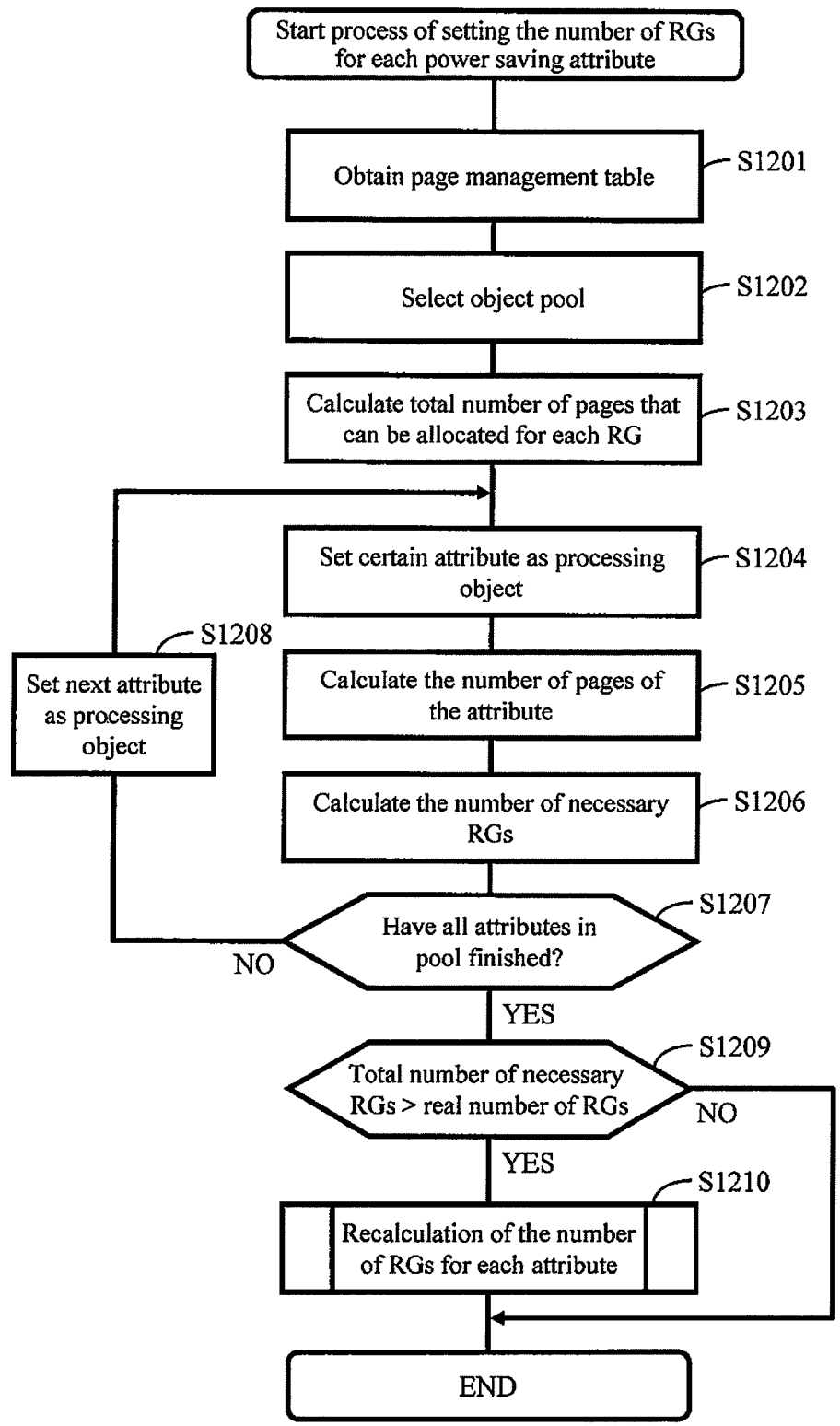
FIG. 12 is a flow chart showing a process of setting the number of RAID groups for each attribute in the embodiment of the present invention.

FIG. 12 is a flow chart showing a process of setting the number of RGs for each power saving attribute. This setting process is executed by the CPU 170 of the storage apparatus 100 subsequently to the page attribute judging process with the attribute managing program 141. In the process of setting the number of RGs for each power saving attribute, the calculation of the number of the RAID groups 250 required for storing the pages 230, to which attributes are given, by the number of the pages 230 present for the respective attributes is executed. Here, the process is also executed with the attribute managing program 141.

In step S1201, the attribute managing program 141 reads out the page management table 300 and obtains the management information of the pages 230.

In step S1202, the pool 240 that is to be subjected to the process of setting the number of RAID group for each power saving attribute is determined. The process of setting the number of RGs for each power saving attribute may be executed on all the pools 240 in the storage apparatus 100 or on just a specific pool 240 in a judging process.

In step S1203, the total number of pages that can be allocated for each RAID group is calculated. The capacity available for each RAID group can be obtained from information including the kind of the HDD 191 that forms the RAID group 250, the RAID level, and the number of data disks. Since the capacity for each page is also predetermined, the total number of pages 230 that can be stored in the RAID group 250 can be calculated. For example, if the page size is 1 GB for the RAID group 250 that has the capacity of 1 TB for storage, the RAID group 250 can store a thousand pages 230.

In step S1204, a certain attribute is set for the pool, which is the processing object, based on the information in Page Attribute 320, which forms the page management table 300.

In step S1205, the total number of pages 230, to which a power saving attribute that is set as the processing object in step S1204 is set, is calculated within the range of pages 230 that have already been assigned to the pool 240 which is the processing object. At that moment, the information in Page Attribute 320 that forms the page management table 300 is referenced.

In step S1206, the number of the RAID groups 250 required for storing the pages 230 of the attribute that is set as the processing object is calculated. For example, the number is obtained by raising the fraction of the value calculated by dividing the number of pages of the attribute, which is calculated in step S1205, by the value of the total number of pages that can be allocated for each RAID group, which is calculated in step S1203. For example, when the value of the total number of the pages that can be allocated for each RAID group is 4 and the number of the pages having 'Unaccessed' Power Saving attribute set thereto is 13, then the number of the RAID groups 250 required is '4', i.e., the value obtained by raising decimals of 3.25 (=13/4) to the next whole number.

In step S1207, whether a series of process has finished for all the attributes that are managed for the pages 230 stored in the pool 240, which is the processing object, or not is judged.

If the judgment shows that the process has not finished for all the attributes yet, the next attribute is set as the processing object in step S1208 and the series of process for the newly set attribute continues from step S1204.

On the other hand, when it is judged that the process has finished for all the attributes, the program proceeds to step S1209 and whether the total number of RAID groups necessary in respective attributes is more than the number of the real RAID groups in the pool 240 or not is judged.

If the judgment shows that the total number of the necessary RAID groups is equal or below the number of the RAID groups in the pool 240, the attribute managing program 141 finishes the process.

On the other hand, when the total number of the necessary RAID groups is more than the number of the RAID groups in the pool 240, the attribute managing program 141 proceeds to step S1210 where it executes a process of recalculating the number of RGs for each attribute and then finishes the above-mentioned process.

Figure 13:
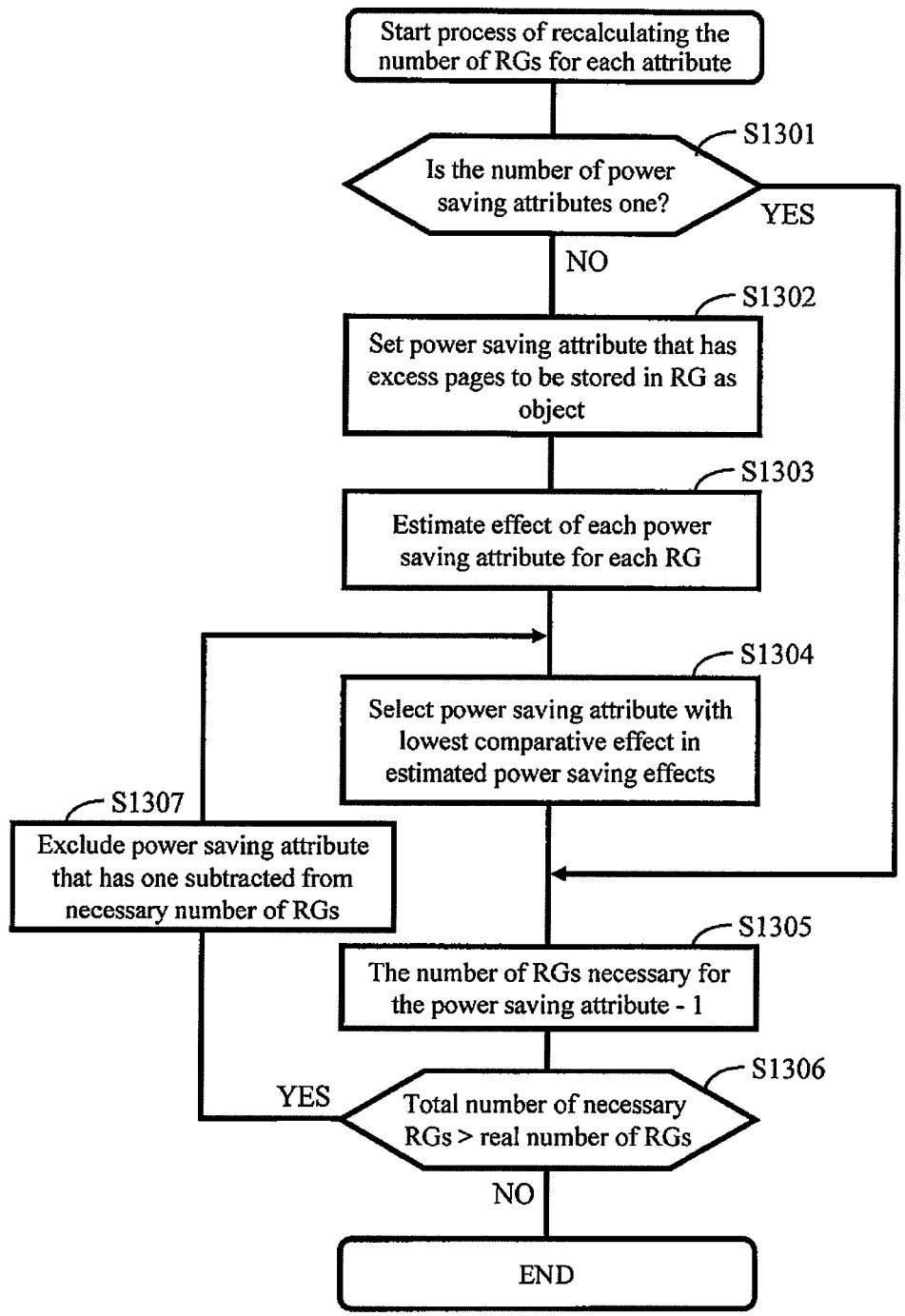
FIG. 13 is a flow chart showing a process of recalculating the number of RAID group settings for each attribute in the embodiment of the present invention.

FIG. 13 is a flow chart of a process of recalculating the number of RGs for each attribute corresponding to step S1210. This process is part of the process executed by the CPU 170 of the storage apparatus 100 based on the attribute managing program 141 for calculating the number of the RAID groups required for storing the pages present for the respective attributes, and is a process for making the number of the RAID groups necessary for the respective attributes match with the number of the RAID groups that form the real pool 240.

In step S1301, the attribute managing program 141 reads out the page management table 300 and judges whether the power saving attributes currently given to all the pages 230 are one kind or two or more kinds. Since this process is not executed on the case where no power saving attribute is present, that case is excluded here.

If the judgment shows that the power saving attribute is one kind, the attribute managing program 141 proceeds to step S1305.

On the other hand, when the judgment shows that the power saving attribute is more than one kind, the attribute managing program 141 proceeds to step S1302.

In step S1302, the power saving attributes that have excess pages to store in the RAID group 250 is set as the processing object. The excess pages are resulted when the number of pages in a certain RAID group 250 that is used in storing pages does not agree with the total number of pages that can be allocated to the RAID group 250.

In step S1303, power saving effect for each RAID group is estimated with respect to each of the power saving attributes that are set as the processing object in step S1302. The power saving effect is estimated based on the information of Last Access Date and Time 340, Access Schedule 350, Access Count 360 recorded in the page management table 300 and the operating mode of each power saving attribute to which the RAID group is transferred, for example. The attribute managing program 141 identifies the model of the HDD 191 in the RAID group 250, to which each power saving attribute is set, for example, from the information of Type Name 620 in the HDD management table 600 or the like and manages the power consumption in the normal operation and the power consumption in the power saving mode based on the specification of the HDD 191. Then, the attribute managing program 141 predicts the power saving effect by obtaining the estimated value of the power consumed under the power saving control from the power saving enabled time and the power consumed in the operating mode, to which the RAID group is transferred during that time. For example, it is assumed that the RAID group 250 of RG'2' has the 'Schedule' Power Saving attribute, can operate under the power saving control during 8:00-24:00, and spins down the HDD 191 under the power saving control. In this case, if the HDD 191 that forms the RAID group 250 has the power consumption in the normal mode of 15 W and that in the Spin Down mode of 2 W, its power consumption per day is estimated roughly 152 WH (=15 W×8 H+2W×16 H). On the other hand, it is assumed that the RAID group 250 of RG'3' has the 'Unaccessed' Power Saving attribute, can operate under the power saving control during 0:00-24:00, and spins down the HDD 191 under the power saving control. In this case, if the HDD 191 that forms the RAID group 250 has the power consumption in the normal mode of 15 W and that in the Spin Down mode of 4 W, its power consumption per day is estimated roughly 96 WH (=4 W×24 H). By comparing the RAID group 250 of RG'2' and that of RG'3' with respect to the power consumption per day, it is understood that the RAID group of RG'3' has the significantly lower power consumption so that it has the higher power saving effect.

In step S1304, the effects estimated in step S1303 are compared with each other, and the power saving attribute that has the lowest power saving effect is selected. In the above-mentioned case, the 'Schedule' Power Saving attribute is selected.

In step S1305, one is subtracted from the number of the RAID groups required for storing the power saving attribute that is selected in step S1304 (the value in step S1206).

In step S1306, whether the total number of the RAID groups required for the respective attributes is more than the number of the real RAID groups in the pool 240 or not is judged again.

If the judgment shows that the number of the RAID groups required for the respective attributes is still more than the number of the real RAID groups, the attribute managing program 141 proceeds to step S1307 where it excludes the power saving attribute that has one subtracted from the number of the necessary RAID groups in step S1305, and then returns to step S1304 and continues the process. Here, the reason for excluding the power saving attribute that has one subtracted from the number of the necessary RAID groups in step S1305 is to enable the RAID groups 250 that has one subtracted from its number to store the pages 230 of the attribute without any excess pages by subtracting one from the allocation numbers.

On the other hand, when the number of the RAID groups required for the respective attributes is the same as that of the real RAID groups, the attribute managing program 141 finishes the process.

Figure 14:
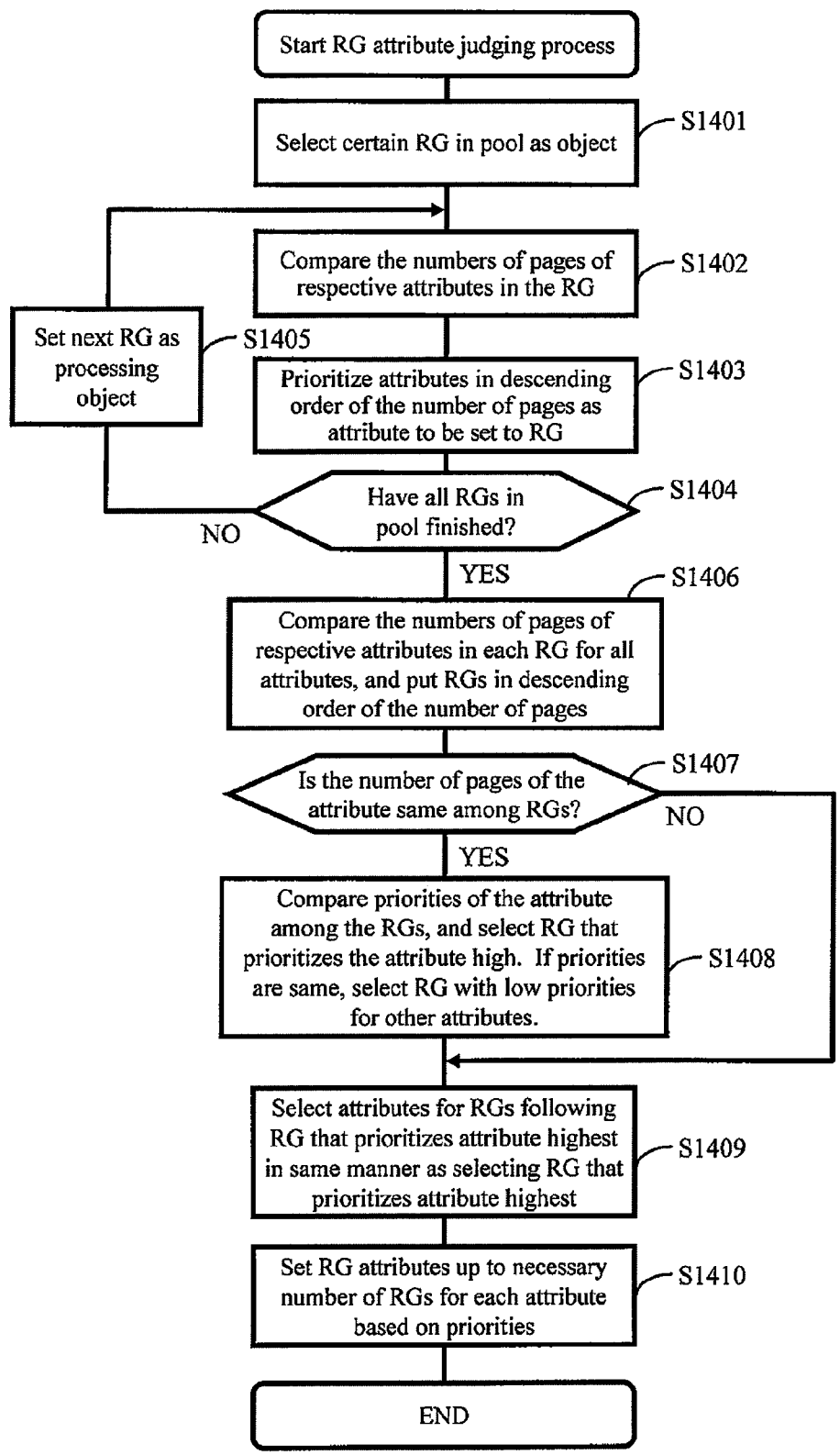
FIG. 14 is a flow chart showing a process of judging the attribute to set to the RAID group in the embodiment of the present invention.

FIG. 14 is a flow chart of an attribute judging process for the RAID group. This judging process is executed by the CPU 170 of the storage apparatus 100 based on the attribute managing program 141 subsequently to the process of setting the number of RGs for each power saving attribute shown in FIG. 13. In this judging process, a suitable attribute is set for each of the RAID groups 250 that form the pool 240 based on the number of the RAID groups for each attribute that is determined in the process of setting the number of RGs for each power saving attribute.

In step S1401, the attribute managing program 141 selects a certain RAID group 250 in the pool 240 as the processing object.

In step S1402, the attribute managing program 141 counts the number of the pages for each attribute that is stored in the RAID group 250 with respect to each attribute that is currently managed in the RAID group 250 selected in step S1401, and compare the numbers.

In step S1403, the attribute managing program 141 puts the attributes in order based on the comparison result in step S1402, specifically based on the number of pages of the respective attributes, so as to set priorities to the attributes in the descending order of the number of pages as the candidates for attributes which is to be set to the RAID group 250. For example, if ten pages 230 of the 'Unaccessed' Power Saving attribute, five pages 230 of 'Schedule' Power Saving attribute, and three pages 230 of 'Normal' attribute are stored in the RAID group 250, the attribute managing program 141 prioritize the 'Unaccessed Power Saving attribute first, the 'Schedule' Power Saving attribute second, and the 'Normal' attribute third as attribute priority for the RAID group 250.

In step S1404, it is judged whether the candidates for attributes in the RAID group 250 have been prioritized with respect to all the RAID groups 250 in the pool or not.

If the judgment shows that the process has not finished for all the RAID groups 250 yet, the next RAID group 250 is set as the processing object in step S1405 and the series of processes continues from step S1402.

On the other hand, if the judgment shows that the process has finished for all the RAID groups 250 in step S1404, the attribute managing program 141 proceeds to step S1406.

In step S1406, the attribute managing program 141 compares the number of pages for each attribute in each RAID group 250 with respect to all the attributes managed in the pool, and puts the attributes in descending order of the number of pages as the object to be set to the RAID groups 250.

In step S1407, the attribute managing program 141 compares the number of pages of the attribute prioritized first in each of the RAID groups 250 among the RAID groups 250, and judges whether or not the number of the pages is the same among the plurality of RAID groups 250 for the attribute.

If the judgment shows that the number of pages of the attribute is not the same, the attribute managing program 141 proceeds to step S1409 according to the order put in step S1406.

On the other hand, if the judgment shows that the number of pages of the attribute is the same in step S1407, the attribute managing program 141 proceeds to step S1408.

In step S1408, among the RAID groups 250 that have the same number of pages of a specific attribute in step S1407, the attribute managing program 141 first selects the RAID group 250 having the attribute of higher priority in the plurality of RAID groups 250 as the higher order in the attribute setting than the other RAID groups 250 having the attribute of lower priority, based on the information prioritized in step S1403, even though the number of pages of the attribute is the same. Then, if the plurality of the object RAID groups 250 have the same priority for the attribute, the attribute managing program 141 compares the priority between the attribute and the other attributes, and selects the RAID group 250 having the other attributes prioritized lower than that of the attribute as the higher order.

In step S1409, the attribute managing program 141 sets respective attributes to the second and following RAID groups 250 to which respective attributes are allocated in the same manner as the ordering manner for setting attribute for each RAID group selected up to step S1408 inclusive.

In step S1410, the attribute managing program 141 sets respective attributes to the remaining RAID groups 250 in the descending order of the priority until the number of the RAID groups required for the predetermined attributes to be allocated is reached, based on the ordering up to step S1409 inclusive. Here, the other attributes are not allocated to the RAID groups 250 to which the specific attribute has been allocated once.

For example, in the embodiment, since the RAID group '5' stores '20' pages of the 'Unaccessed' Power Saving attribute, '10' pages of the 'Schedule' Power Saving attribute, and '5' pages of 'Normal' attribute, the 'Unaccessed' Power Saving attribute is prioritized first, the 'Schedule' Power Saving attribute is prioritized second, and the 'Normal' attribute is prioritized third in the RAID group '5' in step S1403. On the other hand, if the RAID group '1' stores '15' pages of the 230 of the 'Unaccessed' Power Saving attribute, '5' pages of the 'Schedule' Power Saving attribute page, and '10' pages of 'Normal' attribute page, the 'Unaccessed' Power Saving attribute is prioritized first, the 'Normal' attribute is prioritized second, and the 'Schedule' Power Saving attribute is prioritized third in the RAID group '1'. The RAID group '3' stores '20' pages of the 'Unaccessed' Power Saving attribute and '20' pages of the 'Schedule' Power Saving attribute. In that case, both RAID groups '5' and '3' store the same number, '20' pages of 'Unaccessed' Power Saving attribute, which is the most number among the groups. Here, since the 'Unaccessed' Power Saving attribute is prioritized first in both of the RAID groups '5' and '3', priorities to the other attributes are compared. In this case, the 'Schedule' Power Saving attribute is also prioritized first as the 'Unaccessed Power Saving attribute with the same number of pages in the RAID group '3', whereas the 'Schedule' Power Saving attribute is prioritized second in the RAID group '5'. Then, the RAID group '5', which prioritizes the other attributes lower, is ordered to be set the 'Unaccessed Power Saving attribute. In the same manner, as for the 'Schedule' Power Saving attribute, since the RAID group '3' stores 20 pages, the RAID group '5' stores 10 pages, and the RAID group '1' stores 5 pages, the RAID group '3' is selected as the first to be allocated the 'Schedule' Power Saving attribute. Sequentially, the RAID groups 250 that store the pages of the 'Unaccessed' Power Saving attribute fewer than '20' are compared for the number of pages and put in order so that the attributes are set to the previously calculated required number of RAID groups. If the RAID groups 250 have the same condition, any of them may be selected as the object.

Figure 15:
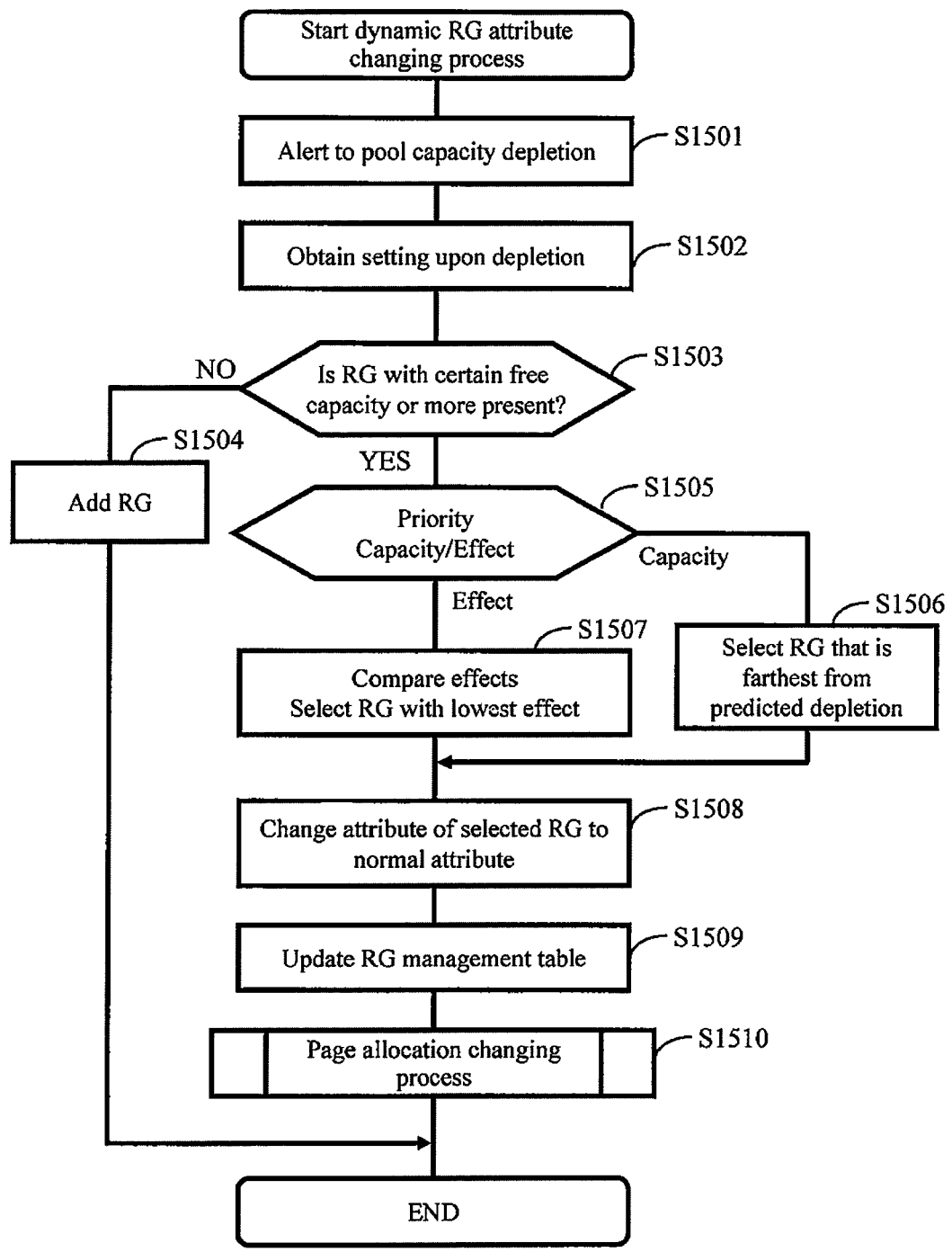
FIG. 15 is a flow chart showing a process of dynamically changing the attribute of the RAID group in the embodiment of the present invention.

FIG. 15 is a flow chart of a dynamic RG attribute changing process. This process is executed in the timing when the CPU 170 of the storage apparatus 100 reviews the attributes for the pages 230 in the pool 240 based on the attribute managing program 141, reallocates the attributes for the RAID groups 250 and moves the pages 230. In this embodiment, the process for the capacity depletion of the pool 240 is described as an example of timing.

In step S1501, the attribute managing program 141, which detects a condition like the capacity depletion of the pool 240 exceeding the threshold or the like, alerts the user and the like from the storage apparatus 100. The alert may be made by any of screen display, buzzer sounds or the like, lighting or a different light color of an indicator or the like.

In step S1502, the setting information of the RAID groups corresponding to the pool 240 at the moment of the capacity depletion of the pool is obtained.

In step S1503, whether the RAID groups 250 with free capacities are present in the pool 240 or not is judged.

If the judgment shows that the RAID group 250 with at least a certain free capacity is not present in the pool 240, the attribute managing program 141 proceeds to step S1504 where it adds the RAID group 250, and then finishes the process. The RAID group 250 is added by the user or the like.

On the other hand, when it is judged that the RAID group 250 with at least a certain free capacity is present in the pool 240, the program proceeds to step S1505.

In step S1505, the priority in the addressing method for the capacity depletion of the pool is judged based on the setting information obtained in step S1502.

If it is judged that the capacity efficiency is prioritized first in step S1508, the attribute managing program 141 proceeds to step S1506 where it selects the RAID group 250 that has the capacity depletion period of time as a RAID group unit first, and then proceeds to step S1508.

On the other hand, when it is judged that the power saving effect is prioritized first in step S1505, the attribute managing program 141 compares the power saving effects for each of the attributes in the pool 240 and selects the RAID group 250 to which the attribute of the lowest effect is set.

In step S1508, the attribute for the RAID group 250 that is selected in step S1506 or step S1507 is changed to 'Normal' attribute.

In step S1509, the attribute managing program 141 updates the RG management table 400 for the information of the RAID group 250 to which the change is made in step S1508.

Figure 22:
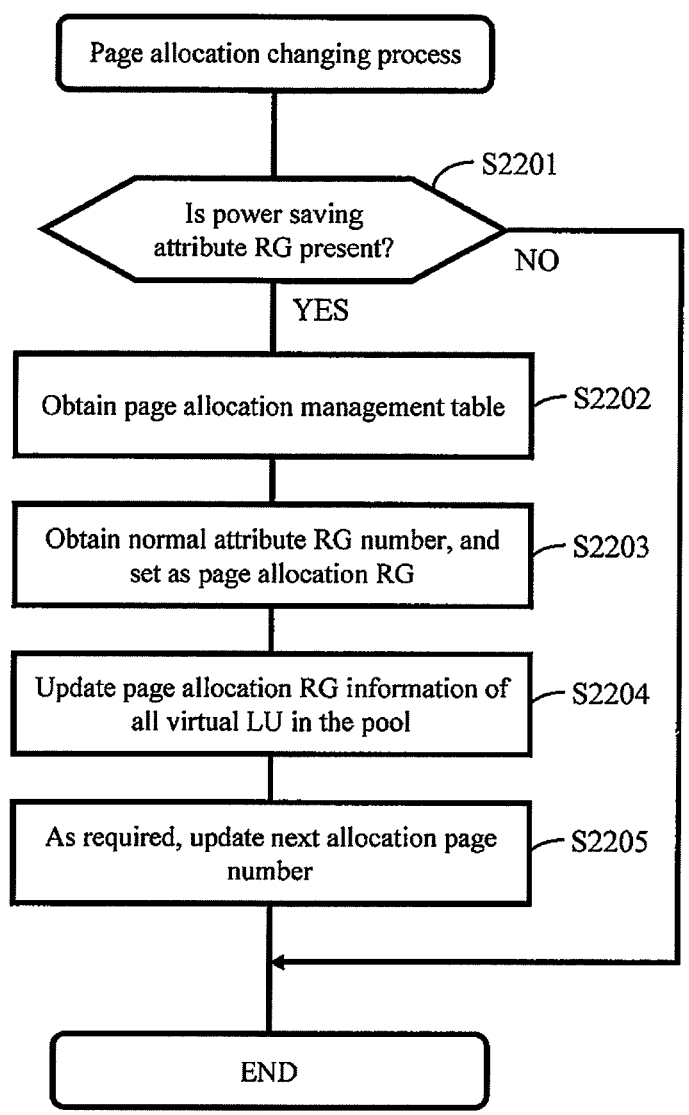
FIG. 22 is a flow chart showing a page allocation changing process in the embodiment of the present invention.

In step S1510, the attribute managing program 141 executes a page allocation changing process, which is to be described in FIG. 22, and finishes the process.

Figure 16:
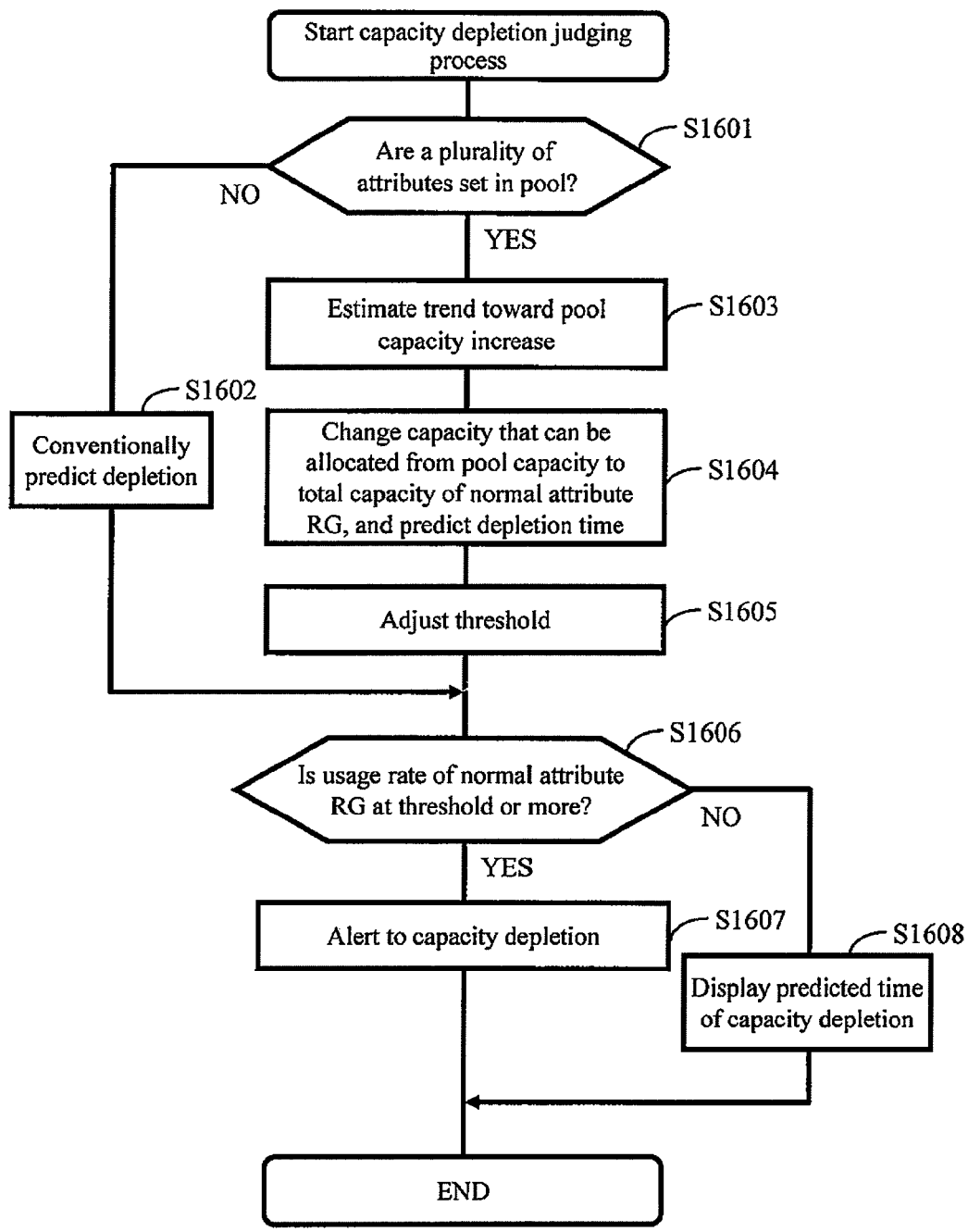
FIG. 16 is a flow chart showing a process of judging capacity depletion of a pool in the embodiment of the present invention.

FIG. 16 is a flow chart of a capacity depletion judging process. In the process, the CPU 170 of the storage apparatus 100 executes capacity depletion judgment on the pool 240 by adding the attribute setting of the embodiment as a condition for a normal pool capacity depletion judging process.

In step S1601, the CPU 170 judges whether a plurality of attributes are managed in the pool 240 or not.

If the judgment shows that attribute classification has not been done or only a single attribute is being managed, the CPU 170 proceeds to step S1602 where it executes a conventional pool capacity depletion judging process, and then proceeds to step S1606.

On the other hand, when the judgment shows that a plurality of attributes are managed in the pool 240 in step S1601, the CPU 170 proceeds to step S1603.

In step S1603, the CPU 170 estimates the trend toward capacity increase of the pool 240.

In step S1604, as the capacity that can be allocated to a new page, the CPU 170 allocates the free capacity of the RAID group 250, to which the 'Normal' attribute is allocated, in the pool 240, instead of the whole of the pool 240, to the trend toward capacity increase estimated in step S1603, and predicts the depletion time of the pool 240 to be allocated to the new page.

In step S1605, the CPU 170 adjusts the threshold of the capacity depletion judgment on the pool 240 as required. Generally, if the used capacity of the pool 240 exceeds a threshold such as exceeding a specific ratio, the user is notified of that by alert display or the like. For example, the above-mentioned adjusting method has a setting of alerting to depletion when 60% or more of the capacity of the pool 240 is used, and if the pool 240 has the whole capacity of 10 TB, it is theoretically alerted to depletion when 6 TB of it is used. When the total capacity of the RAID groups 250 of the 'Normal' attribute in the pool 240 is 5 TB, however, the above-mentioned 6 TB exceeds the capacity of the RAID groups 250 of the 'Normal' attribute to be allocated to pages. Therefore, an adjustment may also be made to make point where the usage rate of the total capacity of the RAID groups 250 of the 'Normal' attribute is exceeded 60%, i.e., the total data stored in the RAID group 250 of the 'Normal' attribute exceeds 3 TB, the threshold.

In step S1606, the CPU 170 judges whether the usage rate of the capacity of the RAID groups 250 of the 'Normal' attribute in the pool 240 exceeds the threshold or not.

If the judgment shows that the threshold is not exceeded, the CPU 170 proceeds to step S1608 where it displays the predicted time of capacity depletion of the pool 240, and finishes the process.

On the other hand, when the judgment shows that the usage rate of the capacity of the RAID groups 250 of the 'Normal' attribute is exceeded in step S1606, the CPU 170 proceeds to step S1607.

In step S1607, the CPU 170 alerts the user and the like to the capacity depletion of the pool 240. The alert may be made in any manner if only it can make the user and the like recognize that the capacity depletion time is approaching such as by displaying as such on the management screen, providing the information to the management software program, or sending an E-mail message.

Figure 17:
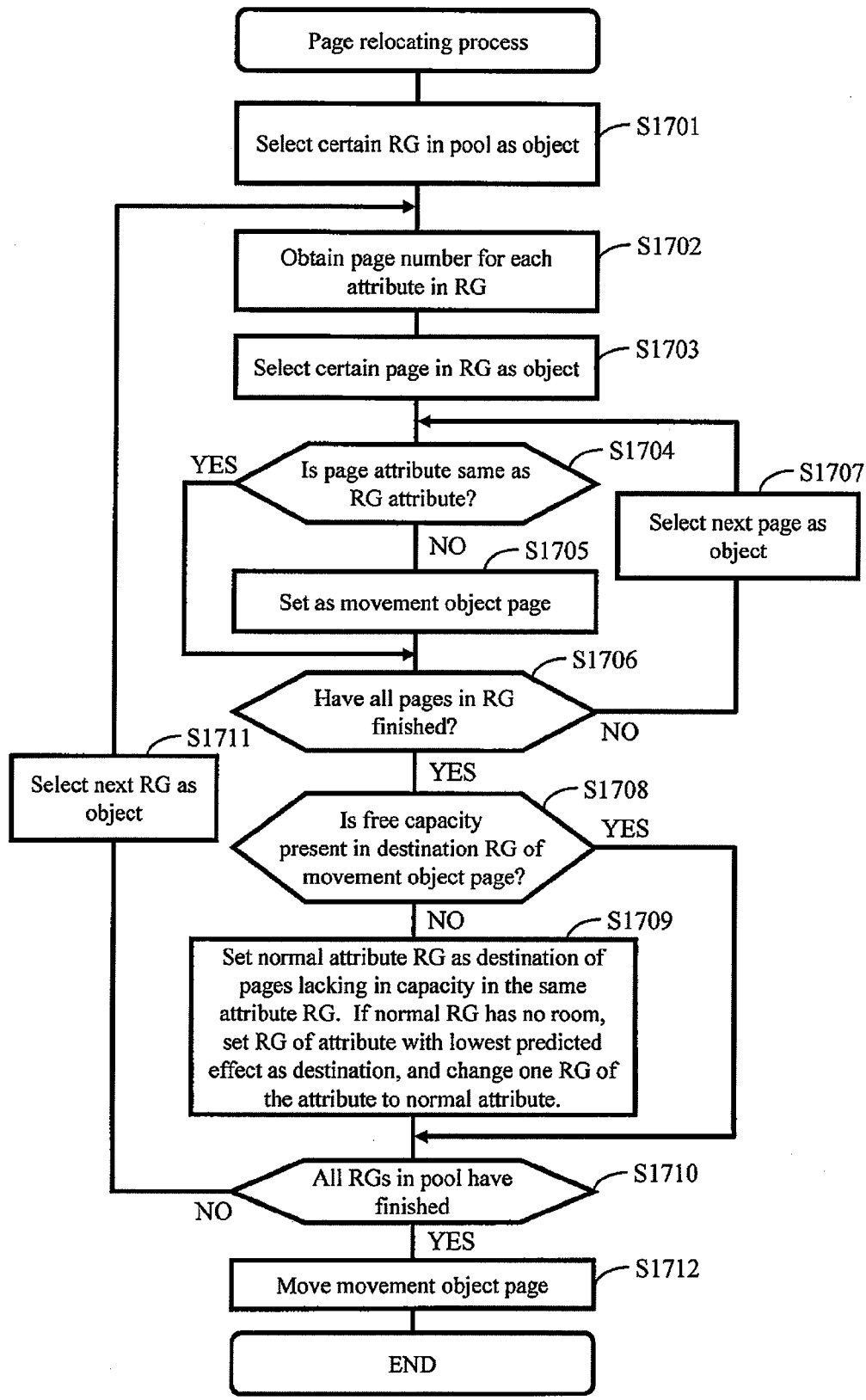
FIG. 17 is a flow chart showing a process of relocating the page in the embodiment of the present invention.

FIG. 17 is a flow chart of a page relocating process. This process is executed by the CPU 170 of the storage apparatus 100 as a moving process for placing the page 230 in a suitable RAID group 250 based on the page moving program 140 subsequent to the RG attribute judging process (FIG. 14).

In step S1701, the page moving program 140 selects a certain RAID group 250 in the pool 240 as the processing object.

In step S1702, the page moving program 140 obtains attribute information on all the pages placed in the RAID group 250 selected in step S1701.

In step S1703, the page moving program 140 sets a certain page 230 in the RAID group 250 as the processing object.

In step S1704, the page moving program 140 judges whether the attribute of the page 230 selected in step S1703 agrees with that of the RAID group 250 or not.

When the judgment shows that they do not agree with each other, the page moving program 140 sets the relevant page 230 as the movement object page in step S1705.

On the other hand, if the judgment shows that the attributes agree with each other, the page moving program 140 proceeds to step S1706.

In step S1706, the page moving program 140 judges whether the judgment on the attribute agreement has finished for all the pages 230 in the RAID group 250 or not.

If the judgment shows that all the pages 230 have not been processed yet, the page moving program 140 sets the next page 230 as the processing object in step S1707, and returns to step S1704.

On the other hand, when the judgment shows that all the pages 230 have been processed, the page moving program 140 proceeds to step S1708.

In step S1708, the page moving program 140 judges whether the destination RAID group 250 of the pages to be moved has free pages or not. Here, whether it has free pages or not means whether the pages 230 of the same attribute can be stored in the RAID group 250 of the same attribute or not after the pages 230 are moved. In determining the destination RAID group 250, the RAID group 250 of the same attribute as that of the pages to be moved is set as the destination. Here, it is assumed that a certain RAID group 250 can store four pages and if there are nine pages 230 of a certain attribute and two RAID groups 250 of the same attribute as that of the pages 230, these RAID groups 250 can store eight pages but cannot store the remaining one page, therefore, the destination RAID group 250 have no free page, for example.

If the judgment shows that the destination RAID group 250 has a free page, the page moving program 140 proceeds to step S1710.

On the other hand, when the judgment shows that the destination RAID group 250 does not have a free page, the page moving program 140 sets the destination of the page 230 that exceeded free page in the destination RAID group 250 to the RAID group 250 of the 'Normal' attribute in step S1709. Further, if the RAID group 250 of the 'Normal' attribute does not have a free page, the page moving program 140 selects, from the power saving attributes other than that of the page 230, the RAID group 250 that is predicted to have the lowest power saving effect, and set it as the destination RAID group 250 of the page 230. At the same time, the attribute of the RAID group 250 set as the destination is changed to 'Normal'.

In step S1710, the page moving program 140 judges whether the destination of the page 230 has been determined for all RAID group 250 in the pool 240 or not.

If the judgment shows that all the RAID groups 250 have not been processed yet, the page moving program 140 selects the next RAID group 250 as the processing object in step S1711, then returns to step S1702 and continues the process.

On the other hand, when the judgment shows that all the RAID groups 250 in the pool 240 have been processed, the page moving program 140 proceeds to step S1712.

In step S1712, the page moving program 140 moves the movement object pages in the pool 240 to the destination RAID groups based on the setting of the destination RAID group 250 that is determined for each page 230 along the process up to step S1709, and finishes this process.

After the moving process, the pages 230 to which the power saving attributes are given are collected in the RAID groups 250 of the attributes same as those of them as much as possible, and the excess pages 230 are collected in the RAID group 250 of the 'Normal' attribute. Since the pages 230 having the same power saving attribute are collected in one RAID group 250, the power saving control for each RAID group can be realized and the power saving effect is improved higher than the conventional techniques.

Figure 18:
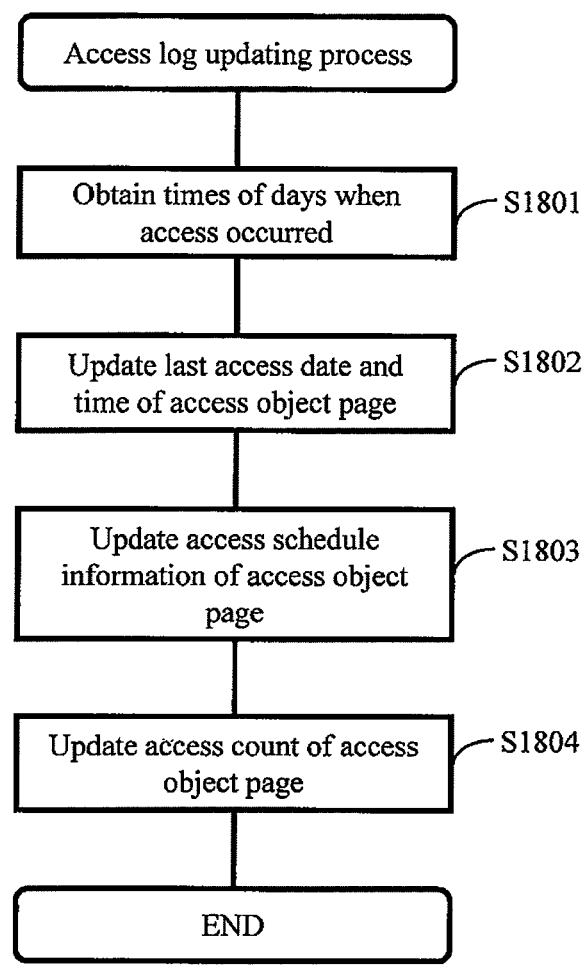
FIG. 18 is a flow chart showing a process of updating an access log for each page in the embodiment of the present invention.

FIG. 18 is a flow chart of an access log updating process. This process is executed by the CPU 170 of the storage apparatus 100 based on the access log managing program 137 to manage access log information according to accesses to the HDD 191.

In step S1801, in response to an I/O request or the like from the host computer 160, the access log managing program 137 obtains time information on when the HDD 191 was accessed. The time information may be information from the timer managed by the storage apparatus 100 or time information obtained from outside through a network like NTP.

In step S1802, the access log managing program 137 updates the cell of Last Access Date and Time 340 on the page management table 300 with the time information obtained in step S1801.

In step S1803, the access log managing program 137 updates the information cell of Access Schedule 350 on the page management table 300. In the embodiment, for example, the information cell of Access Schedule 350 shows the access occurrence for each hour by '1' or '0' with respect to 24 hours of a day. Therefore, the access log managing program 137 updates the access information in the corresponding time zone based on the time information obtained in step S1801. Alternatively, the access log managing program 137 executes the access log updating process at every hour, and updates the value corresponding to the time zone in the information cell of Access Schedule 350 on the page management table 300 based on the access occurrence. The access log information update may be made by reflecting the 24-hour log of access or by judging the access occurrence limitedly for a predetermined period of time, day, or time zone and updating the information.

In step S1804, the access log managing program 137 updates the counter value in an access object page with respect to the information cell of Access Count 360 on the page management table 300.

The access log needs not to be necessarily updated in response to an access, and if the user has a specified period of time in advance, for example, the access log information may be updated by monitoring the access to the information only during the period. If the time period ends, the count is newly started from '0'.

Figure 19:
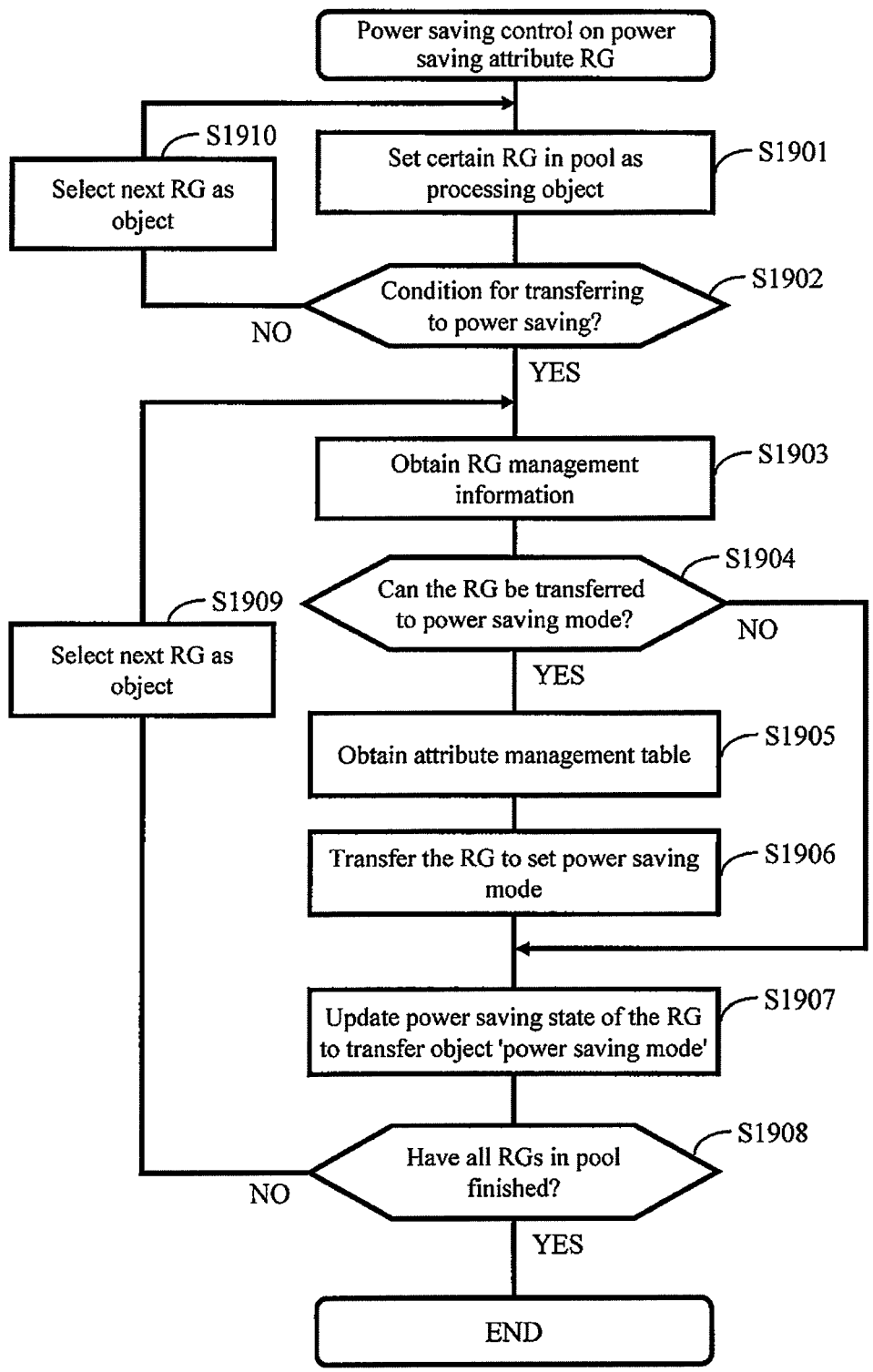
FIG. 19 is a flow chart showing a power saving controlling process on the RAID group of a power saving attribute in the embodiment of the present invention.

FIG. 19 is a flow chart of a power saving controlling process on the power saving attribute RG. This process is executed by the CPU 170 of the storage apparatus 100 based on a power saving control condition to perform power saving control on the RAID group 250 that can be subjected to the power saving control.

In step S1901, the CPU 170 sets a certain RAID group 250 in the pool 240 as a processing object.

In step S1902, the CPU 170 judges whether the RAID group 250 selected in step S1901 meets a condition for transferring to power saving or not. The condition for transferring to power saving is such that the RAID group 250 is in an unaccessed state for a certain time period, for example 30 minutes, that there is the RAID group 250 that is not accessed for a month, that a time zone when the RAID group 250 is not used has come in a day under the schedule control, or the like. The power saving control condition may be held in the storage apparatus 100 in advance, or may be a condition set by the user or the like.

If the judgment shows that it does not meet the condition for transferring to power saving, the CPU 170 proceeds to step S1910 where it selects the next RAID group 250 as the processing object, and then returns to step S1901 to continue processing.

On the other hand, when the judgment shows that the RAID group 250 meets the power saving condition, the CPU 170 proceeds to step S1903.

In step S1903, the CPU 170 reads in the RG management table 400 and obtains the management information on the RAID group 250.

In step S1904, the CPU 170 judges whether the RAID group 250 can be transferred to the power saving mode or not. The CPU 170 judges whether the RAID group 250 can be transferred to the power saving mode or not based on the power saving enabled time information in the management information on the RAID group 250 that the CPU 170 obtained in step S1903 for this judgment. In this embodiment, for example, the power saving enabled time for the RAID group '2' is set to 8:00-24:00. Therefore, if the time of judgment is within that time zone, the CPU 170 judges that it can be transferred to the power saving mode. On the other hand, since it is set that the RAID group '1' can enter the power saving mode after being in the unaccessed idle state for 30 minutes, the CPU 170 judges whether it can be transferred to the power saving mode or not by comparing the last access Date and Time 340 with the current time.

If the judgment shows that the RAID group 250 cannot be transferred to the power saving mode, the CPU 170 proceeds to a process at step S1907.

On the other hand, when the judgment shows that the RAID group 250 can be transferred to the power saving mode in step S1904, the CPU 170 proceeds to a process at step S1905.

In step S1905, the CPU 170 obtains the information on Operating Mode 920, to which the RAID group 250 is to be transferred, from the attribute management table 900.

In step S1906, the CPU 170 transfers the RAID group 250 to Operating Mode 920 that is obtained in step S1905.

In step S1907, the CPU 170 updates the information in operating state 430 on the RG management table 400 for the RAID group 250 to Operating Mode 920 to which it is transferred in step S1906.

In step S1908, the CPU 170 judges whether all the RAID groups 250 in the pool 240 has been processed or not.

If the judgment shows that all the RAID groups 250 have not processed yet, the CPU 170 selects the next RAID group 250 as the object in step S1909, and then returns to step S1903 and continues the process.

On the other hand, when the judgment shows that all the RAID groups 250 have been processed, the CPU 170 finishes the process.

Figure 20:
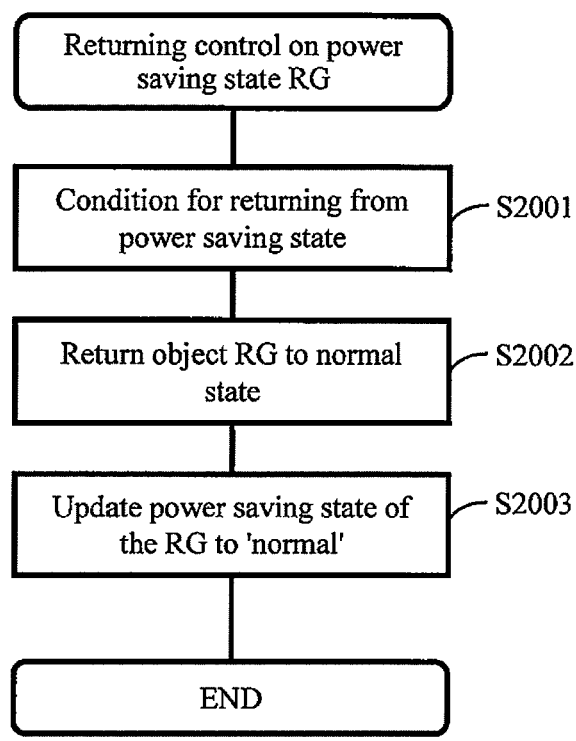
FIG. 20 is a flow chart showing a returning process of the RAID group in a power saving mode to a normal mode in the embodiment of the present invention.

FIG. 20 is a flow chart of a returning control on power saving state RG. This process is executed by the CPU 170 of the storage apparatus 100 to transfer the RAID group 250 to the normal state according to a returning condition from the power saving state. The returning process to the normal state is executed for each RAID group 250 at the time that matches the returning condition.

In step S2001, the CPU 170 indicates entering the returning condition from the power saving state. In the embodiment, the returning condition is such that the I/O request is issued from the host computer 160, or that it has reached the time set for the RAID group 250 to operate according to the schedule management, for example.

In step S2002, the CPU 170 executes the returning process on the object RAID group 250. It returns the RAID group 250 operating in the power saving mode to the normal state, and if required, executes a Read/Write process or the like on the RAID group 250.

In step S2003, the CPU 170 updates Operating State 430 on the RG management table 400 to the operating mode in the normal state with respect to the power saving state of the RAID group 250. For example, in the embodiment, since the operating mode in the normal state is set as Idle, it sets the operating state 430 for the RAID group 250 as Idle.

FIG. 21 shows an example of the management screen according to the embodiment. A power consumption management screen 2101 shows an example of a visual indication of the power consumption change of the storage apparatus 100 in the form of the line graph to the user. The power consumption management screen displays the power reduction effect to the user by showing electric power changes for two types of operation, the power saving operation 2102 and the normal operation 2103. It shows that storage apparatus 100 was transferred to the power saving mode operation at the point where the line of the power saving operation 2103 branches from the line of the normal operation 2102 on the graph. The management screen enables the viewer to compare the estimated power consumption value in the case where the RAID group of the power saving attribute is reserved due to relocation of the page 230 and the RAID group is operated in the power saving mode as shown in the embodiment and the estimated power consumption value in the case where the RAID group is operated in the conventional manner without relocation of the page 230, by calculating both of the values.

The display format may be in a bar graph or other types of graph or by showing the values. The display format may be in any form as long as it can display necessary information to the user.

The power consumption may be calculated by incorporating a hardware device for metering electric power such as a wattmeter into the storage apparatus 100, a distribution switchboard or the like, or may be calculated in the form of an electric power estimated value by a method of estimating the power consumption from the components or the operating state of the storage apparatus 100. Further, the power consumption may be calculated for the whole storage apparatus as a unit so that the calculated value is displayed or for smaller unit such as for each pool 240 or each RAID group 250 so that the calculated value is displayed.

The power saving effect management screen 2111 displays Power Consumption 2113 and Reduction Rate 2114 of the power consumption for each unit of metering 2112 as well as the effect for each power saving attribute. For example, in the embodiment, the power consumption 2113 and the reduction rate 2114 are shown for each pool 240. FIG. 21 shows that the power consumption 2113 of the pool A is 340 wh and the reduction rate 2114 of the power consumption is 46%. It is shown that the effect of power saving operation 2102 can be provided in fact in comparison with the estimated value of the power consumption value for the normal operation 2103 for the pool A, since the pool A has an occasion of transferring the RAID group 250 to the power saving mode. On the other hand, it is shown that the power consumption 2113 is 720 wh and the reduction rate 2114 of the power consumption is 0% for the pool B.

The effect for each power saving attribute is calculated according to the power saving attribute set for the RAID group 250, which corresponds to Power Saving Area 2115. For example, in the embodiment, it is shown that a power saving time 2116 for operating the 'Unaccessed' power saving attribute area in the power saving mode is '24 h/day', i.e., the area is operated in the power saving mode for 24 hours per day. The cell of Reduction Rate 2117 shows the power saving effect in the power saving operation 2102 in comparison with the estimated value of the power consumption value in the normal operation 2103. FIG. 21 shows that the reduction rate 2117 of the 'Unaccessed' power saving attribute is 90%. The capacity percentage 2118 is the percentage of the capacity of the power saving attribute area in the whole capacity of the storage apparatus 100 or pool 240. FIG. 21 shows that the area of the 'Unaccessed' power saving attribute occupies 10% area of the pool 240. The bigger the reduction rate 2117 and the capacity percentage 2118 are, the bigger the power saving effect in the RAID group of the power saving attribute is. Just for reference, since the power saving time for the RAID group of the 'Schedule' power saving attribute is so long as '16 h/day' and the capacity percentage is so high as 30%, the reduction rate is 70%.

FIG. 22 is a flow chart of a page allocation changing process. This process is executed by the CPU 170 of the storage apparatus 100 to change the range of area for the new page to be allocated to the virtual volume 200, subsequently to the page attribute judging process and the page relocating process.

In step S2201, whether the RAID group 250 set in the power saving attribute is present in the pool 240 or not is determined.

If the judgment shows that the RAID group 250 of the power saving attribute is not present, the process ends.

On the other hand, when the judgment shows that the RAID group 250 of the power saving attribute is present, the CPU 170 reads out the page allocation management table 1000 and obtains the setting information about the allocation of the page 230 in step S2202.

In step S2203, the CPU 170 obtains the identifier of the RAID group 250 of the 'Normal' attribute associated with the pool 240 among the RAID groups 250 based on the RG management table 400, and sets it as the RAID group 250 for the page 230 to be allocated.

In step S2204, the CPU 170 updates the allocation information of the pages 230 for all the virtual volumes 200 corresponding to the pool 240. Specifically, it sets information on the RAID groups 250 to which the pages 230 of the corresponding all the virtual volumes 200 are to be allocated to the set of the RAID groups 250 set in step S2203 and updates the information cell of Allocation RG 1030 on the page allocation management table 1000. Consequently, the new page is to be allocated to the RAID group 250 of the 'Normal' attribute at first.

In step S2205, the page 230 to be allocated next is changed as required. When the page ID managed in the information cell of Next Allocation Page ID 1040 on the page allocation management table 1000 is the page 230 included in Allocation RG 1030 before the above-mentioned update, it is not updated. In step S2205, when the page 230 in the RAID group 250 that has not been included in the allocation RAID groups 250 continuously from the time before the update is set, such as the case where the page 230 from the RAID group 250 that was deleted from Allocation RG 1030 is still set, the CPU 170 determines the page 230 to be allocated next from the range of the updated Allocation RG 1030 according to a conventional page allocation policy, and then updates Next Allocation Page ID 1040 on the page allocation management table 1000 and finishes the process.

Figure 23:
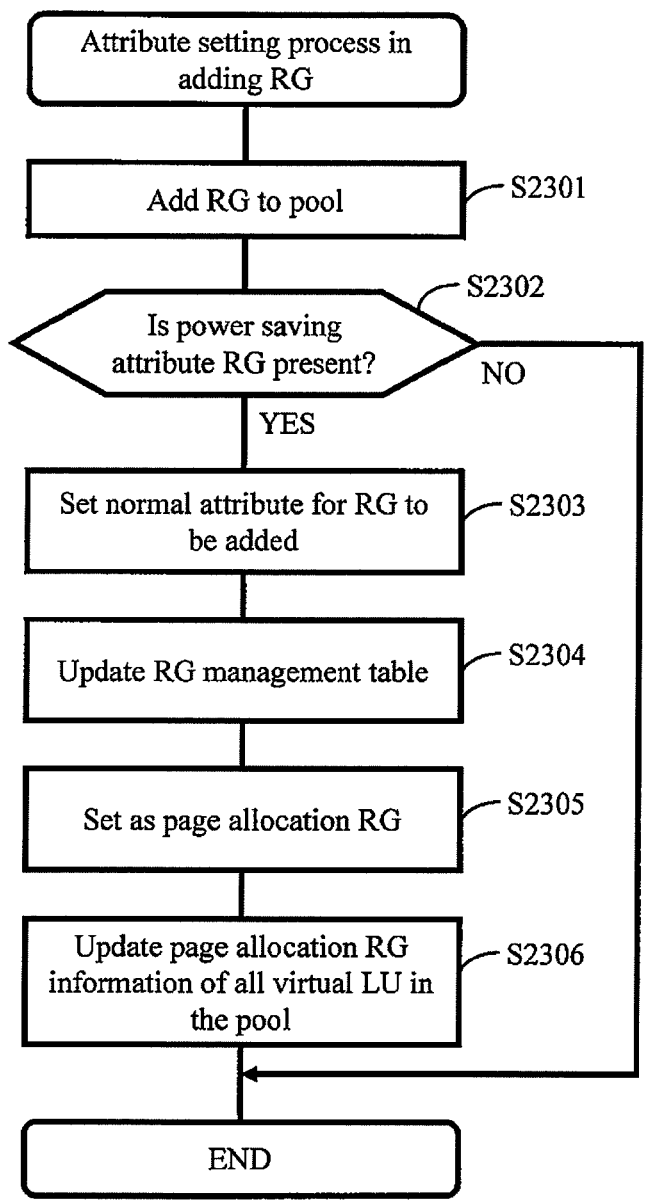
FIG. 23 is a flow chart showing an attribute setting process in adding the RAID group in the embodiment of the present invention.

FIG. 23 is a flow chart of an attribute setting process in adding RG. This setting process is a process for the CPU 170 of the storage apparatus 100 to set the attribute for the added RAID group 250 when it is added to the pool 240 based on the attribute managing program 141.

In step S2301, the RAID group 250 is additionally registered to the pool 240.

In step S2302, the attribute managing program 141 judges whether the RAID group 250 having the power saving attribute is present or not among the existing RAID groups 250 that form the pool 240, to which the RAID group 250 is newly added.

If the judgment shows that no RAID group 250 having the power saving attribute is present, the program finishes the process.

On the other hand, when the judgment shows that the RAID group 250 of the power saving attribute is present, the program proceeds to step S2303.

In step S2303, the program sets the 'Normal' attribute for the RAID group 250 to be added.

In step S2304, the RG management table 400 is updated by adding the entry for the newly added RAID group 250 to the RG management table 400, setting 'Normal' in Power Saving Attribute 420 for the RAID group 250, and setting Operating Mode 920 corresponding to the 'Normal' attribute also for Operating State 430.

In step S2305, the newly added RAID group 250 is set as the RAID group 250 for the pages 230 to be allocated.

In step S2306, the setting information on the page allocation management table 1000 is updated by adding the RAID group 250 as Allocation RG 1030 of the pages 230 for all the virtual volumes 200 corresponding to the pool 240 to which the RAID group 250 is added, and the process is finished. For example, in the embodiment, if the RG '3' is newly added to the pool ID '1' on the page allocation management table 1000, the page allocation management table 1000 is updated by adding RG '3' to the information cells of Allocation RG 1030 for the entries in the Virtual LU '1', the Virtual LU '2', and Virtual LU '3' corresponding to the pool 240.

As mentioned above, according to the embodiment, even in the storage apparatus 100 in which a group of virtual volumes used by various host computers 160 shares the area of the pool 240, data can be classified into attributes according to access patterns by the unit smaller than the volume so that the data of the same attribute is aggregated in the RAID group 250 of the same attribute without requiring the user to manage. As a result, the power saving operation by the unit of RAID group 250 effectively functions so that the power consumption of the storage apparatus 100 can be reduced.

Example 2

In the embodiment, the storage apparatus 100 with data de-duplication technology realizes the power saving control as the result of determining data aggregation on the condition of data duplication.

The de-duplication technology reduces the capacity in the case where a plurality of data with the same content are stored in the storage apparatus 100, for example, by storing one of the data in the storage apparatus 100 as the master data and deleting the other data of the same content. As for the deleted data, only pointer information to the master data is left for management. Accordingly, even when a Read request is issued from the host computer 160, the data stored in the storage apparatus 100 in fact can be referenced by tracing the pointer information.

The unit in judging the data duplication may be a file on a file system, a page 230, or a certain specific size, for example. For example, the page IDs 830 with the same identifier among a plurality of virtual page IDs 820 that belong to different Virtual LUs 810 on the address mapping table 800 (FIG. 8) is taken as the unit.

Generally, a method using hash values is used as the method for judging the data duplication. The judging method may be comparing of the data per se or any other methods as long as they can judge the agreement of data.

If the data have a high degree of duplication, the master data after the de-duplication has a plurality of data referencing entities including the various host computers 160. Therefore, it is predicted that the master data after the de-duplication is accessed more frequently than the data without duplication. Then, the embodiment realizes the power saving of the storage apparatus 100 by aggregating the pages that are not de-duplicated in the RAID group of the power saving attribute.

This embodiment will be described below in detail especially on differences from Example 1. This embodiment is also based on the configuration of the storage apparatus 100 shown in FIG. 1. However, the inner structure of a memory 120 in the embodiment differs from that in Example 1.

Figure 24:
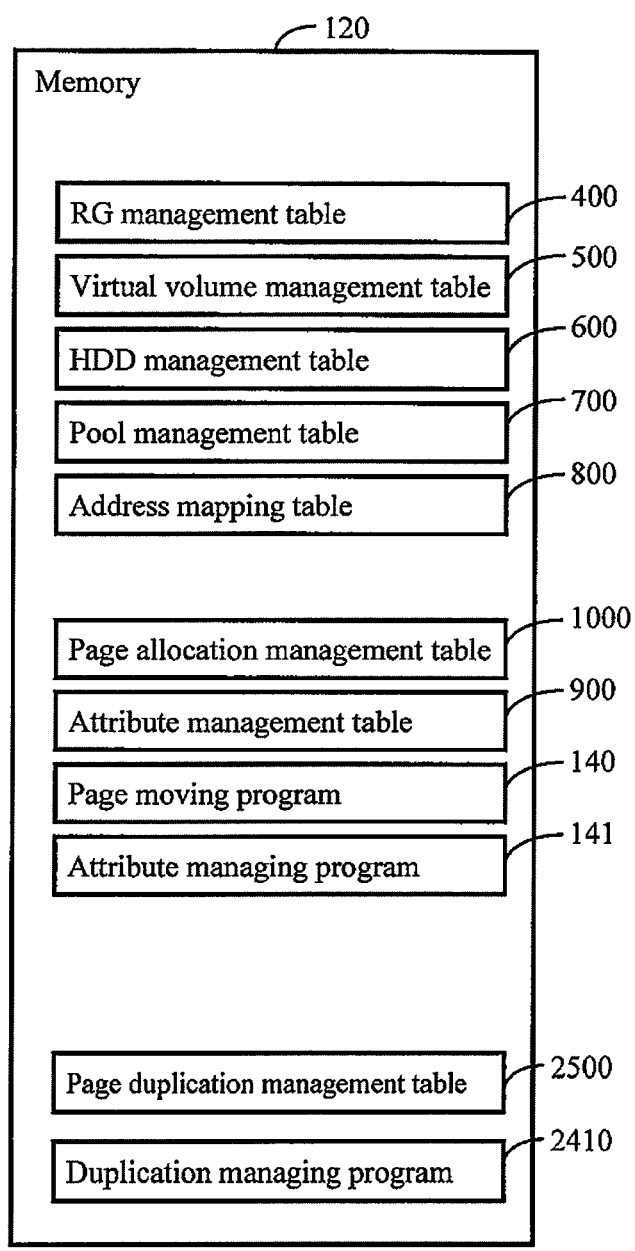
FIG. 24 is a block diagram of a memory on a storage apparatus in the embodiment of the present invention.

FIG. 24 shows a configuration example of the memory 120 used in the embodiment. Instead of the access log managing program 137 and page management table 300 with respect to the page 230 stored in the memory 120 shown in FIG. 1, a page duplication management table 2500 and a duplication managing program 2410 are stored in this embodiment. The other tables and programs are the same as those in FIG. 1.

The page duplication management table 2500 and the duplication managing program 2410 are stored here because this embodiment adopts data duplication, instead of the access patterns, as the condition for setting the power saving attribute.

The page duplication management table 2500 is for managing the page 230, the data of which is a duplicate of and associated with and referenced by a certain virtual page 210, in the case where the page 230 is the unit of judging the duplication. The duplication managing program 2410 is for judging whether the data stored in the storage apparatus 100 has a duplicate by the unit of virtual page 210 and managing the association between the data and its duplicate.

FIG. 25 is a schematic diagram of the page duplication management table 2500. The page duplication management table 2500 is formed by Page ID 2510, Page Attribute 2520, Referencing Page ID 2530, Duplication 2540, and RG 2550.

In Page ID 2510, an identifier for uniquely identifying the page 230 is stored. In Page Attribute 2520, the setting information indicating whether the page 230 has the power saving attribute, the object of the power saving control, or the normal attribute for operating in a normal state is stored. In Referencing Page ID 2530, an identifier for identifying the virtual page 210 that duplicately references the data stored in the page 230 that is identified by the page ID 2510 is stored. In Duplication 2540, the value indicating how many virtual pages 210 that the page 230 has duplicate with is stored. In RG 2550, an identifier of the RAID group 250 that the page 230 belongs to is stored.

In the case of FIG. 25, for example, the page 230 of the page ID '0' has '10', '20', '30', '35', and '38' associated therewith and stored as the referencing page IDs 2530 and has '5' stored in the cell of Duplication 2540 as the number of duplicates. That is, the page 230 of the page ID '0' stores the data that is the same by the unit of page referenced by five virtual pages 210 and has the duplication set to '5'. The page attribute 2520 for the page 230 of high duplication like that is set as Normal attribute.

On the other hand, the page 230 of the page ID '1' with the duplication '3', the page 230 of the page ID '2' with the duplication '1', and the page 230 of the page ID '3' with the duplication '0' have Power Saving attribute set in Page Attribute 2520. FIG. 25 shows an example of allocating either of the two types of page attribute according to the duplication. Three or more types of page attribute can be allocated according to the duplication as a matter of course.

Figure 26:
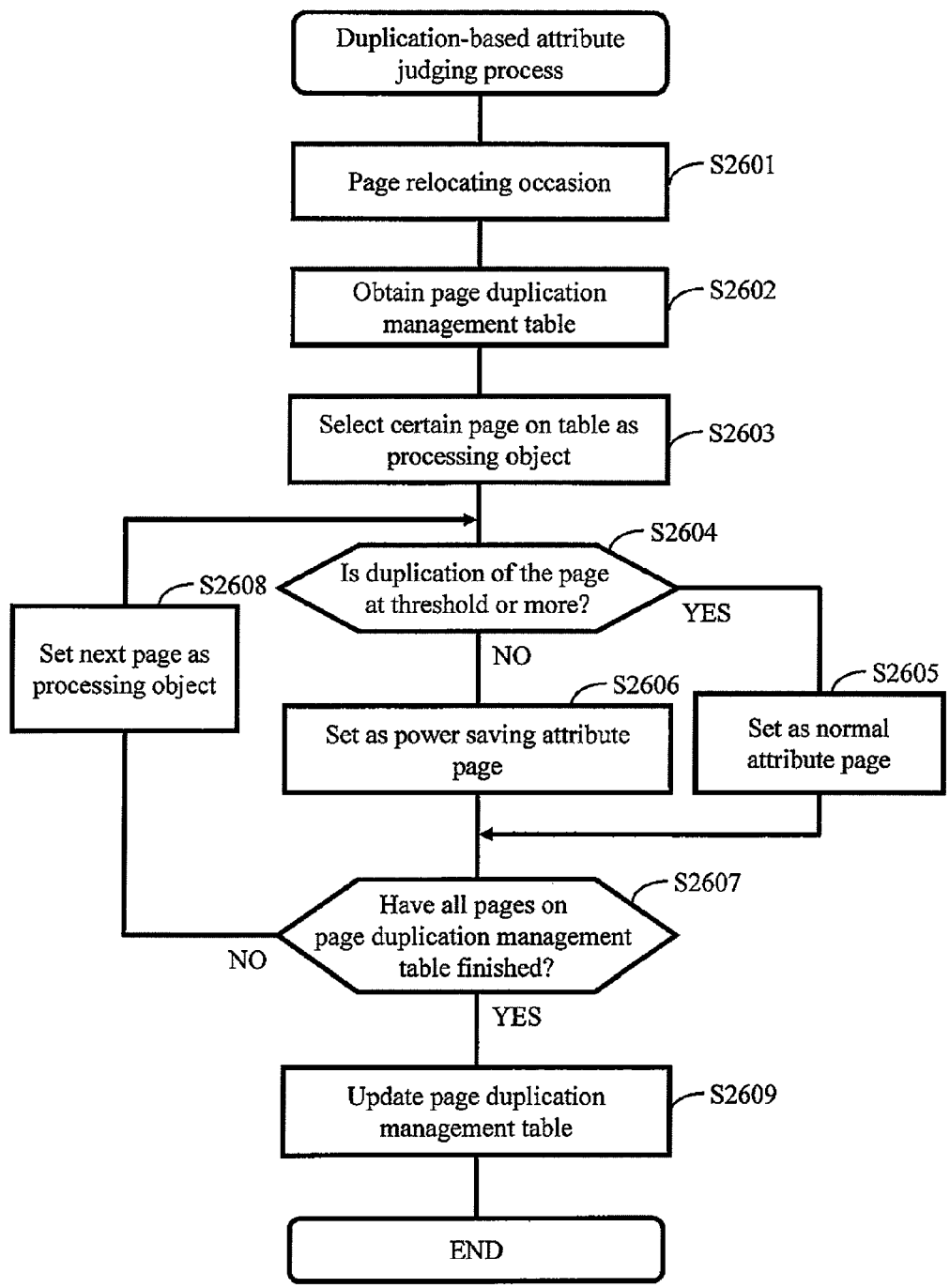
FIG. 26 is a flow chart showing a page duplication judging process in the embodiment of the present invention.

FIG. 26 is a flow chart of a duplication-based attribute judging process. This setting process is executed by the CPU 170 of the storage apparatus 100 based on the duplication managing program to detect and manage the data duplication in the storage apparatus 100.

In step S2601, the duplication managing program 2410 is invoked at the occasion of a page relocating process and executed.

In step S2602, the duplication managing program 2410 reads out the page duplication management table 2500 and obtains information on the page 230 and the data duplication.

In step S2603, the duplication managing program 2410 selects a certain page 230 on the duplication management table 2500 as the processing object.

In step S2604, the duplication managing program 2410 judges whether or not the duplication 2540 of the page 230 selected in step S2603 is at the threshold or more. The page 230 that is the master data for a certain number or more duplicates generally has a lot of referencing virtual pages 210 and virtual volumes 200; therefore, it is predicted that the page 230 is frequently accessed by the host computer 160 or the like. In contrast, it is predicted that the page 230 storing data with no duplication or the page 230 of low duplication is less frequently accessed than the page of high duplication. According to the prediction, the page 230 of low duplication is set as the object of the power saving control.

Incidentally, the value of the threshold for duplication-based attribute judgment may be a predetermined value managed by the storage apparatus 100 or a value set by the user. It is preferable to find the value that is expected to provide the power saving effect and set as the threshold.

If the judgment in step S2604 shows that the duplication 2540 of the page 230 is at the threshold or more, the duplication managing program 2410 proceeds to step S2605 where it sets the page 230 as the page 230 of the Normal attribute, and then proceeds to step S2607.

On the other hand, when the judgment shows that the duplication 2540 of the page 230 is below the threshold in step S2604, the duplication managing program 2410 proceeds to step S2606 where it sets the page 230 as the page 230 of the power saving attribute.

In step S2607, the duplication managing program 2410 judges whether all the pages 230 on the duplication management table 2500 have been processed or not.

If the judgment shows that all the pages 230 have not been processed yet, the duplication managing program 2410 proceeds to step S2608 where it sets the next page 230 as the processing object, and returns to step S2604 and continues the process.

On the other hand, when the judgment shows that all the pages 230 have been processed in step S2607, the duplication managing program 2410 reflects the power saving attribute set to the page 230 to the page attribute 2520 for the page duplication management table 2500 in step S2609, and finishes the process.

As for the attribute managing process for the page 230, the attribute managing process for the RAID group 250, and the relocating process for the page 230, the same processes as those in Example 1 are executed.

As mentioned above, according to the embodiment, in the storage apparatus 100 in which a group of virtual volumes used by various host computers 160 shares the area of the pool 240, data can be classified into attributes according to data duplication so that the data that is predicted to be infrequently accessed due to its low degree of duplication can be aggregated in the same RAID group 250 without requiring the user to manage. As a result, the power saving operation effectively functions on the RAID group 250 in which the storage areas of the same access pattern and the same attribute are aggregated so that the power consumption of the storage apparatus 100 can be reduced.

Moreover, in the embodiment, with management information on the page 230 that is duplicately referenced from a plurality of referencing entities, the power saving attribute is managed by the unit of page so that the power saving control can be executed by the unit of page. In comparison with the case where various types of management information are managed for all the pages 230, the embodiment can reduce the usage of the memory 120 that form the storage apparatus 100.

Example 3

In the embodiment, an example having the managing functions of Example 1 and Example 2 incorporated therein will be described. Specifically, the case where the power saving control is realized in the storage apparatus 100 with de-duplication technology by classifying data of each page 230 into attributes, classifying the RAID groups into attributes, and aggregating each page for each attribute on the condition of the access log information for the allocated pages 230 and data duplication will be described.

This embodiment will be described below in detail especially on differences from the above-mentioned Example 1 and Example 2. This embodiment is based on the configuration of the storage apparatus 100 shown in FIG. 1. In this embodiment, the page duplication management table 2500 of Example 2 is integrated in the page management table 300 and the process by the duplication managing program 2410 is integrated in that by the page moving program 140.

FIG. 27 shows a schematic diagram of a page management table 2700 used in the embodiment. In FIG. 27, the parts corresponding to those in FIG. 3 are denoted by the same reference numerals. The page management table 2700 includes Page ID 310, Page Attribute 320, RG 330, Last Access Date and Time 340, Access Schedule 350, Access Count 360, and Duplication 370. In Page ID 310, an identifier for uniquely identifying the page 230 is stored. In Page Attribute 320, an attribute for the page 230 is stored. In RG 330, an identifier of the RAID group 250 to which the page 230 belongs is stored. In Last Access Date and Time 340, the date and time when the page 230 is accessed last is stored. In Access Schedule 350, information on occurrence of access to each page 230 for each hour is stored. In Access Count 360, the value of the counted number of accesses occurred to the page 230 in a predetermined certain time period is stored. In Duplication 370, the value indicating how many virtual pages 210 that the page 230 has duplicate data with is stored.

In the case of FIG. 27, for example, the page 230 of the page ID '0' has the 'Normal' attribute set. The duplication 370 of the page 230 is '20'. That shows that the page 230 stores duplicate data of 20 virtual pages 210, which means that the page 230 is a real page 230 referenced from the 20 virtual pages 210. Therefore, information on a union of the accesses to the 20 virtual pages 210 is stored in the entry of the page 230 on the page management table 2700 for Last Access Date and Time 340, Access Schedule 350, and Access Count 360. The entry for Last Access Date and Time 340, for example, stores the last date and time of the access issued from any of the 20 virtual pages 210. Access Schedule 350 records the access occurrence if any of the 20 virtual pages 210 accesses the page.

Figure 28:
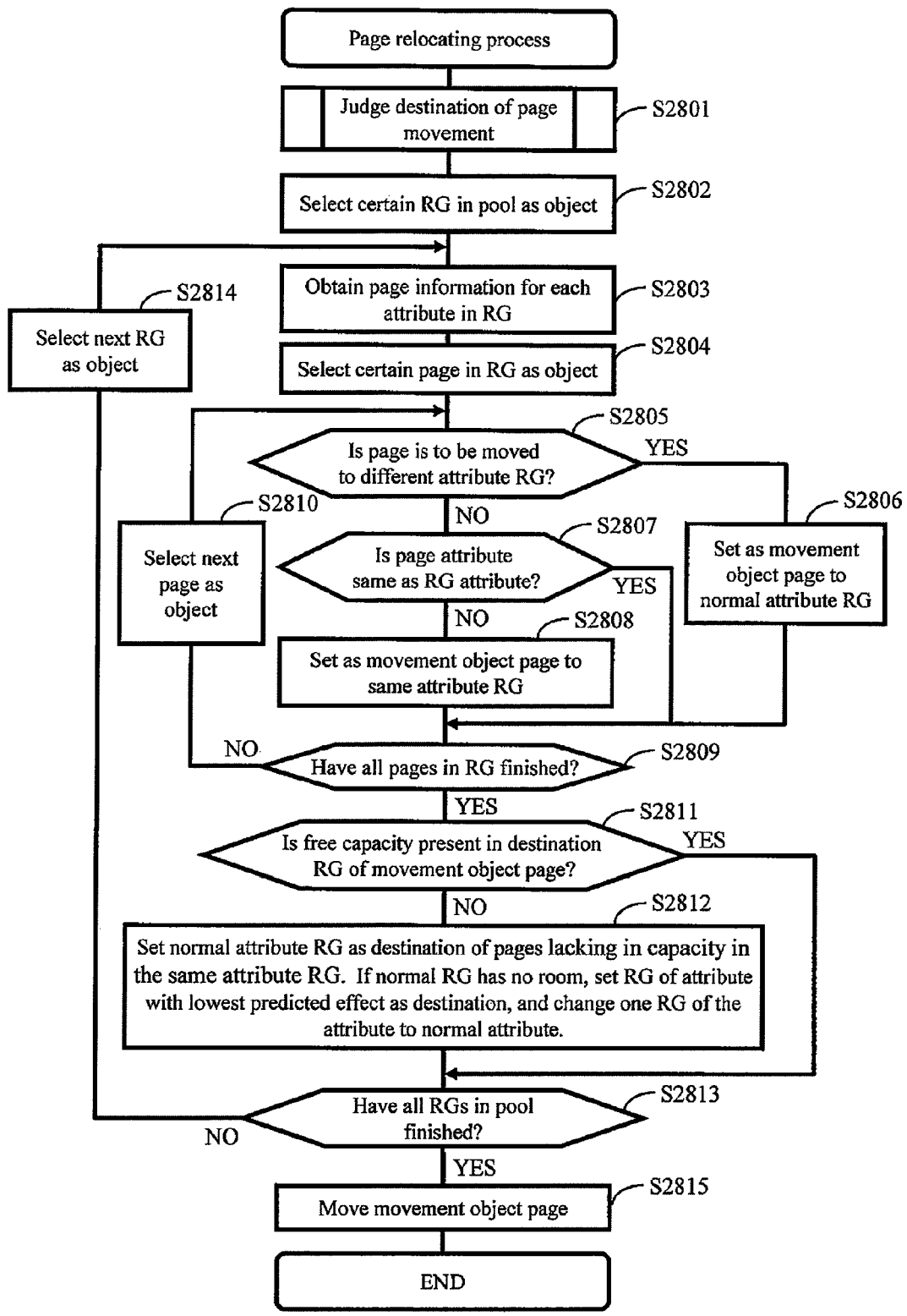
FIG. 28 is a flow chart showing a page relocating process in the embodiment of the present invention.

FIG. 28 is a flow chart of a page relocating process. This process is executed by the CPU 170 of the storage apparatus 100 based on the page moving program 140 subsequently to the page attribute judging process shown in FIG. 1. In this process, the page moving program 140 is the process for intensively moving the pages 230, to which the attributes are given in the previous process, to the RAID group 250 of the same attribute so that the pages 230 are placed to enable the power saving control.

In step S2801, the page moving program 140 judges the destination of the page 230. The process will be detailed later.

In step S2802, the page moving program 140 selects a certain RAID group 250 in the pool 240 as the processing object.

In step S2803, the page moving program 140 obtains a list of page IDs 310 for each attribute for all the attributes given to the pages 230 in the RAID groups 250 selected in step S2802.

In step S2804, the page moving program 140 selects a certain page 230 in the RAID group 250 as the processing object.

In step S2805, whether the page 230 selected in step S2804 is a page to be moved to the RAID group of different attribute or not is judged.

If the judgment shows that the page is a page to be moved to the RAID group of the different attribute, the page moving program 140 sets the page 230 as the movement object page to the RAID group of the 'Normal' attribute in step S2806, and proceeds to step S2809.

On the other hand, when the judgment shows that the page 230 is not the page to be moved to the RAID group of the different attribute, the page moving program 140 proceeds to step S2807.

In step S2807, the page moving program 140 judges whether the attribute for the page 230 agrees with the attribute for the RAID group 250 that stores the page 230 or not.

If the judgment shows that the attribute for the page 230 agrees with the attribute for the RAID group 250, the page moving program 140 proceeds to step S2809.

On the other hand, when the judgment shows that the attribute for the page 230 does not agree with the attribute for the RAID group 250, the page moving program 140 sets the page 230 as the movement object page to the RAID group 250 of the same attribute as that for the page 230. For example, if the attribute for the page 230 is 'Unaccessed' Power Saving attribute and the attribute for the RAID group 250 that stores the page 230 is 'Normal' attribute, the page moving program 140 sets the page 230 as the movement object to another RAID group 250 of the same 'Unaccessed' Power Saving attribute.

In step S2809, the page moving program 140 judges whether the movement object judging process has finished for all the pages 230 in the RAID group 250 or not.

When the judgment shows that the process has finished for all the pages 230 in the RAID group 250, the page moving program 140 proceeds to step S2811.

On the other hand, if the process has not finished for all the pages 230 in the RAID group 250 yet, the page moving program 140 proceeds to step S2810 where it sets the next page 230 as the processing object page, and returns to step S2805 and continues the process.

In step S2811, the page moving program 140 judges whether the destination RAID group 250 has a free page or not for the movement object page setting for each page 230 that has been set up to step S2809. That is, it judges whether the destination RAID group 250 still has free capacity so that the page 230 can be moved thereto or not. According to the correlation between the number of pages that can be stored in the RAID group 250 for each of the predetermined attributes and the number of movement object pages to the RAID group 250 of the attribute, there may be a deficient page 230 when the pages 230 of the attribute is moved to the RAID group 250 of the attribute.

If the judgment shows that the destination RAID group 250 has a free page so that the page 230 can be moved thereto, the page moving program 140 proceeds to step S2813.

On the other hand, when the judgment shows that the destination RAID group 250 does not have a free page and therefore cannot reserve capacity for the movement, the page 230 cannot be moved thereto, the page moving program 140 proceeds to step S2812.

In step S2812, the page moving program 140 changes the setting of the destination of the object page 230 that cannot be moved to the destination RAID group 250 due to lack of capacity from the destination RAID group 250 to the RAID group 250 of the Normal attribute. If the normal RAID group 250 in the pool 240 does not have a free page 230 either and does not provide a capacity for the page 230 to be moved thereto, the page moving program 140 sets the destination RAID group 250 to the RAID group 250 that has a free capacity among the RAID groups 250 of the power saving attribute that is predicted to provide the lowest power saving effect in the RAID groups 250 of the other power saving attributes. After making the setting to the RAID group 250, the program changes the attribute for the RAID group 250 that is set as the destination RAID group 250 to the 'Normal' attribute.

For example, in the case where there are five pages 230 of the 'Unaccessed' Power Saving attribute, six pages 230 of the 'Schedule' Power Saving attribute, and three pages 230 of the 'Normal' attribute, and one RAID group 250 can store four pages and the pool 240 has four RAID groups 250, and if it is judged that the 'Unaccessed' Power Saving attribute has the higher power saving effect than the 'Schedule' Power Saving attribute, one RAID group 250 takes the 'Normal' attribute, two RAID groups 250 take the 'Unaccessed' Power Saving attribute, and one RAID group 250 takes the 'Schedule' Power Saving attribute.

In this case, since two pages among the pages 230 of the 'Schedule' Power Saving attribute cannot be stored in the RAID group 250 of the same attribute, the pages need to be moved to the RAID group 250 of the Normal attribute. The RAID group 250 of the 'Normal' attribute has only one page of a free page 230, however. Therefore, the two pages 230 cannot be moved to the RAID group 250 of the 'Normal' attribute either.

Then, one of the remaining RAID groups 250 of the 'Unaccessed' Power Saving attribute is set to the destination RAID group 250 for the pages 230 of the 'Schedule' Power Saving attribute. In this case, since a plurality of pages 230 of the different attributes are mixed in one RAID group 250 when the pages 230 have been moved, the attribute for the RAID group 250 is changed to the 'Normal' attribute.

In step S2813, the page moving program 140 judges whether all the RAID groups 250 in the pool 240 have been processed or not.

If the judgment shows that all the RAID groups 250 have not been processed yet, the page moving program 140 selects the next RAID group 250 as the processing object in step S2814, and returns to step S2803 and continues the process.

On the other hand, when the judgment shows that all the RAID groups 250 have been processed, the page moving program 140 proceeds to step S2815.

In step S2815, the page moving program 140 moves the movement object pages to the corresponding destination RAID groups 250 respectively and finishes the process.

Figure 29:
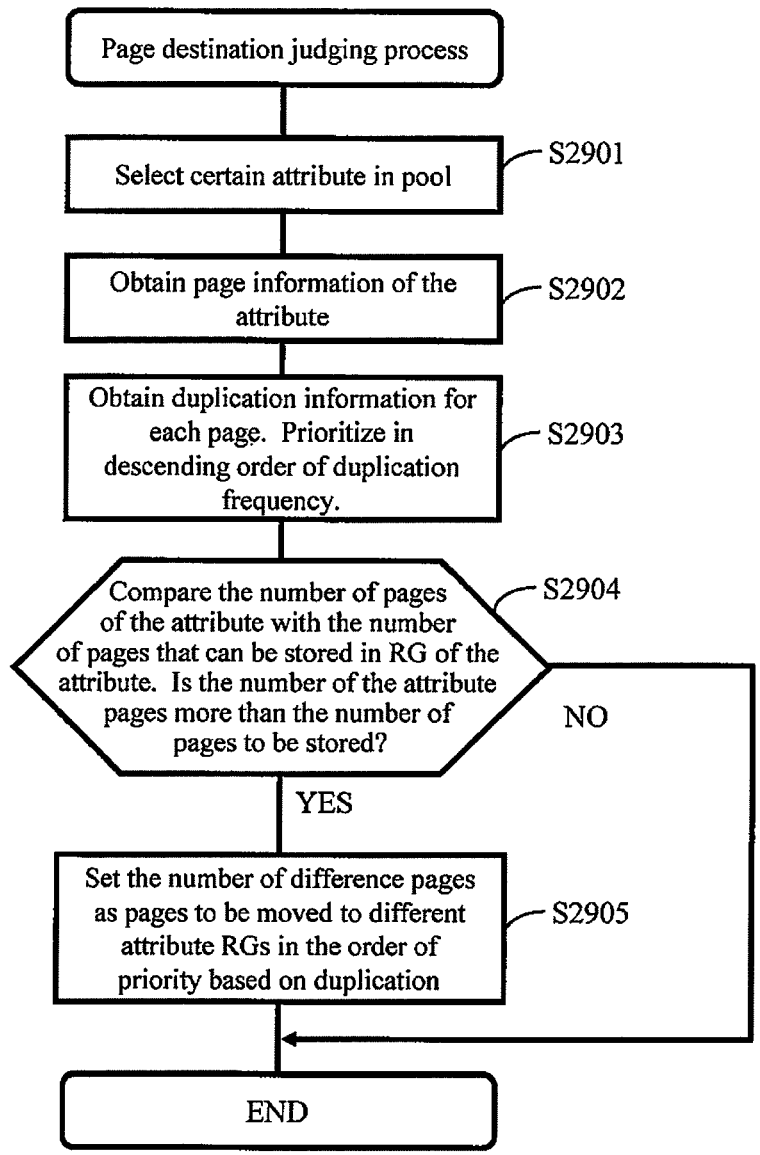
FIG. 29 is a flow chart showing a process of judging a destination of the page in the embodiment of the present invention.

FIG. 29 is a flow chart of a page destination judging process. This process is executed by the CPU 170 of the storage apparatus 100 based on the page moving program 140 subsequently to the page attribute judging process shown in Example 1. In this process, the page moving program 140 judges the destination of the pages 230, to which attributes are given in the previous process, based on the attributes and duplication so that the pages 230 are placed to enable the power saving control. This process corresponds to step S2801 of the page relocating process shown in FIG. 28.

In step S2901, the page moving program 140 selects a certain attribute in the pool 240.

In step S2902, the page moving program 140 obtains information on the page(s) 230 of the attribute selected in step S2901.

In step S2903, the page moving program 140 obtains duplication information for each page 230, the information on which is obtained in step S2902. Then, the page moving program 140 prioritizes the pages 230 of the same attribute in the descending order of the duplication.

In step S2904, the page moving program 140 compares the number of pages 230 of the attribute and the number of pages 230 that can be stored in the RAID group 250 of the same attribute to judge whether the number of the pages of the attribute are more than the number of pages 230 that can be stored or not.

If the judgment shows that the number of pages of the attribute is less than the number of pages that can be stored in the RAID group 250 of the attribute, the page moving program 140 finishes the destination judging process.

On the other hand, when the judgment shows that the number of the pages of the attribute is more than the number of pages 230 that can be stored in the RAID group 250 of the attribute, the page moving program 140 proceeds to step S2905.

In step S2905, the program sets the number of difference pages between the number of pages of the attribute and the number of pages that can be stored in the RAID group 250 of the attribute in pages to be moved to the RAID group 250 of the different attribute. Then, the page moving program 140 selects the pages by the number of difference pages in the descending order of the priority set in step S2903, sets the selected pages 230 as the pages to be moved to the RAID group 250 of the different attribute, and finishes the destination judging process.

Also in this embodiment, the processes in the case of Example 1 are executed for the attribute managing process on the page 230 and the attribute managing process on the RAID group 250.

As mentioned above, according to the embodiment, even in the storage apparatus 100 in which a group of virtual volumes used by various host computers 160 shares the area of the pool 240, data can be classified into attributes according to the access patterns of the data so that the pages 230 which have similar unaccessed time zones can be aggregated in the same RAID group 250 without requiring the user to manage. As a result, the power consumption of the storage apparatus 100 can be reduced. Moreover, in the embodiment, the pages 230, which are highly probable to be accessed by taking account of the duplication as well as the access patterns, are highly prioritized as the movement object. Therefore, the pages of a lower degree of duplication can be preferentially aggregated in the RAID group of the power saving attribute. In contrast, among the pages of the same attribute, those having relatively high duplication and also relatively high probability to be accessed compared to other same attribute page can be aggregated in the RAID group of the Normal attribute. Consequently, the embodiment can reduce the storage capacity and also improve the power saving effect.

REFERENCE SIGNS LIST

100 storage apparatus
110 controller
137 access log managing program
140 page moving program
141 attribute managing program
160 host computer
170 CPU
200 virtual volume
230 page
240 pool
250 RAID group
300 page management table
400 RG management table
500 virtual volume management table
600 HDD management table
700 pool management table
800 address mapping table
900 attribute management table
1000 page allocation management table
2410 duplication managing program
2500 page duplication management table

The invention claimed is:

1. A storage apparatus comprising a plurality of storages for storing data, and a controller connected to a host computer via a network, wherein
    said controller provides a virtual storage area as a virtual volume in response to an access from said host computer;
    when said host computer accesses said virtual volume, allocates a storage area from a real volume, said real volume is reserved on said plurality of storages as a pool area;
    records an access log for each storage area on said real volume;
    gives an attribute to said storage area according to said access log;
    gives an attribute to each of a plurality of RAID groups, which form said pool area, according to a storage capacity for each attribute of said storage areas; and
    moves the storage areas classified to a specific attribute intensively to the RAID group of the same attribute as that of the storage areas, based on said attributes information.

2. The storage apparatus according to claim 1, wherein when an unaccessed time period in said access log recorded for the storage area is longer than a judgment threshold, said controller classifies the storage area to an attribute (unaccessed) that indicates that the area stores data that has not been accessed for a certain time period or more.

3. The storage apparatus according to claim 1, wherein when it is detected that the storage area has not been accessed for a certain time period or more in a specific time zone in said access log recorded for the storage area, said controller classifies the storage area to an attribute (schedule) that indicates that the area stores data that has not been accessed for a certain time period or more in the specific time zone.

4. The storage apparatus according to claim 1, wherein when the number of accesses in said access log recorded for the storage area is equal to or less than a judgment threshold, said controller classifies the storage area to an attribute (infrequently accessed) that indicates that the area stores data that has been infrequently accessed in a certain time period.

5. The storage apparatus according to claim 1, wherein said controller judges an attribute to give to the RAID group that stores said storage area preferentially from the attribute of higher power saving effect, and classifies said storage area.

6. The storage apparatus according to claim 1, wherein said controller calculates the number of RAID groups that form a storage capacity required for storing the storage area, to which the attribute is given, in said pool area, and gives the same attribute as that of said storage area to the RAID groups by the number.

7. The storage apparatus according to claim 1, wherein when the attribute has been given to each of said storage areas and said RAID groups, and then said storage areas are to be moved to said RAID groups of the same attributes as those of the storage areas but a destination RAID group does not have a enough capacity to store said storage areas, said controller changes the destination of said storage areas to the RAID group that is allowed to include the storage areas of different attributes.

8. The storage apparatus according to claim 7, wherein if a new destination RAID group does not have a enough capacity to store said storage areas, said controller newly sets one RAID group, to which the attribute of the lowest power saving effect is given, among the RAID groups of other attributes as the destination, and changes the attribute which is given to the RAID group set as the destination, to an attribute that indicates that the RAID group is allowed to include the storage areas of different attributes.

9. The storage apparatus according to claim 1, wherein said controller records the access log for the storage area each time the storage area is accessed, checks the access log for the storage area at each certain time period, and updates the attribute to give to the storage area based on the checked access log; and said controller dynamically updates the attribute to give to each of the RAID groups which form said pool area, according to the storage area of the updated attribute.

10. The storage apparatus according to claim 1, wherein when the attributes are given to said storage areas and said RAID groups in the pool area, and said controller newly provides the virtual storage area in response to the access to the virtual volume allocated on the pool area, said controller allocates the storage area of the RAID group to which an attribute that is not an object of power saving control is given.

11. The storage apparatus according to claim 1, wherein when the attributes are given to said storage areas and said RAID groups in the pool area and a new RAID group is added to the pool area, said controller gives the attribute that is not an object of power saving control to the added RAID group.

12. The storage apparatus according to claim 1, wherein when said controller has given the attributes to said storage areas based on said access logs, and then gives a higher priority to the much duplicated storage area from the virtual pages among the storage areas of the same attribute, and if said controller needs to move the storage areas to the RAID groups of the attributes different from those of the storage areas, said controller moves the storage areas in the descending order of the priority to the RAID groups of other attributes.

13. The storage apparatus according to claim 1, wherein said controller manages the duplication from the virtual pages for each storage area instead of recording said access log, and gives the attribute to said storage area according to the duplication.

14. The storage apparatus according to claim 1, wherein said controller has moved said storage areas to said RAID groups based on said attributes, and then displays an effect of reducing power consumption in the storage apparatus, said display of the effect of reducing power consumption is made for each of the attributes given to said storage areas or for each area of said pool area or RAID group.

15. A power control method in a storage apparatus comprising a plurality of storages for storing data, and a controller connected to a host computer via a network, wherein said controller provides a virtual storage area from a virtual volume in response to an access from said host computer;

when said host computer accesses said virtual volume, allocates a storage area from a real volume, said real volume is reserved on said plurality of storages as a pool area;

records an access log for each storage area on said real volume;

gives an attribute to said storage area according to said access log; gives an attribute to each of a plurality of RAID groups, which form said pool area, according to a storage capacity for each attribute of said storage areas; and moves the storage areas classified to a specific attribute intensively to the RAID group of the same attribute as that of the storage areas, based on information on said attributes.

* * * * *